(12) United States Patent
Dalton et al.

(10) Patent No.: US 11,674,615 B2
(45) Date of Patent: Jun. 13, 2023

(54) VALVE ASSEMBLY FOR DISPENSERS

(71) Applicant: The Procter & Gamble Company, Cincinnati, OH (US)

(72) Inventors: David Andrew Dalton, Mason, OH (US); John Boyet Stevens, Mason, OH (US); Kelsey Erin Gibboney, Cincinnati, OH (US); Philip Andrew Sawin, Wyoming, OH (US); Jennifer Elizabeth Hosmer, Fairfield, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 322 days.

(21) Appl. No.: 16/914,517

(22) Filed: Jun. 29, 2020

(65) Prior Publication Data
US 2021/0025518 A1 Jan. 28, 2021

Related U.S. Application Data

(60) Provisional application No. 63/021,146, filed on May 7, 2020, provisional application No. 62/878,924, filed on Jul. 26, 2019.

(51) Int. Cl.
*F16K 1/30* (2006.01)
*F16K 41/02* (2006.01)
*F17C 13/04* (2006.01)

(52) U.S. Cl.
CPC .............. *F16K 41/02* (2013.01); *F16K 1/303* (2013.01); *F16K 1/308* (2013.01); *F17C 13/04* (2013.01);

(Continued)

(58) Field of Classification Search
CPC .......... F16K 1/303; F16K 1/308; F16K 41/02; F17C 13/04; F17C 2205/0388; F17C 2205/0323; F17C 2205/0382
See application file for complete search history.

(56) References Cited

U.S. PATENT DOCUMENTS 2,704,172 A  3/1955 Lapin
2,704,622 A  3/1955 Soffer
(Continued)

FOREIGN PATENT DOCUMENTS

BR  112019003059 A2  5/2019
CN     1515473 A      7/2004
(Continued)

OTHER PUBLICATIONS

U.S. Appl. No. 16/914,512, filed Jun. 29, 2020, Robert Paul.
(Continued)

*Primary Examiner* — Jason K Niesz
(74) *Attorney, Agent, or Firm* — Steven Robert Chuey

(57) ABSTRACT

A valve assembly for a dispenser. The valve assembly includes a valve body that extends about a longitudinal axis and defines an outer surface and an inner passageway. The valve body includes a first valve body surface and a second valve body surface opposite the first valve body surface. A valve stem extends through the inner passageway and includes an outer stem surface, an inner stem surface opposite the outer stem surface, and a first orifice extending from the outer stem surface to the inner stem surface. A resilient member is disposed on at least a portion of the first valve body surface. The resilient member is made from a resilient polymeric material and has a non-linear compression profile.

23 Claims, 19 Drawing Sheets

(52) U.S. Cl.
CPC .............. *F17C 2205/0323* (2013.01); *F17C 2205/0382* (2013.01); *F17C 2205/0388* (2013.01)

(56) References Cited

U.S. PATENT DOCUMENTS

| | | | |
|---|---|---|---|
| 2,772,814 A | 12/1956 | David | |
| 2,812,884 A | 11/1957 | Ward | |
| 2,829,806 A | 4/1958 | Tedaldi | |
| 2,863,699 A | 12/1958 | Elser | |
| 2,994,461 A | 8/1961 | Daniel | |
| 3,101,875 A | 8/1963 | Daniel | |
| 3,333,743 A | 8/1967 | Meyers | |
| 3,403,804 A | 10/1968 | Colombo | |
| 3,450,254 A | 6/1969 | Miles | |
| 3,450,316 A | 6/1969 | Barker | |
| 3,549,050 A | 12/1970 | Bruce | |
| 3,581,941 A | 6/1971 | Bruce | |
| 3,606,088 A | 9/1971 | Baltzer | |
| 3,685,695 A | 8/1972 | Yuhas | |
| 3,827,609 A | 8/1974 | Arnaldo | |
| 4,134,523 A | 1/1979 | Hansen et al. | |
| 4,165,825 A | 8/1979 | Hansen | |
| RE30,093 E | 9/1979 | Burger | |
| 4,330,066 A | 5/1982 | Berliner | |
| 4,765,516 A | 8/1988 | Metcoff | |
| 4,805,813 A | 2/1989 | Metcoff | |
| 4,940,170 A | 7/1990 | Popp-ginsbach | |
| 4,958,755 A | 9/1990 | Gerstung | |
| 5,419,463 A | 5/1995 | Mizushima et al. | |
| 5,727,715 A | 3/1998 | Mckenna et al. | |
| 5,785,301 A | 7/1998 | Scheindel | |
| 6,019,252 A | 2/2000 | Benecke et al. | |
| 6,039,222 A | 3/2000 | Smith | |
| 6,058,960 A | 5/2000 | Kopp | |
| 6,152,190 A | 11/2000 | Smith | |
| 6,161,599 A | 12/2000 | Smith | |
| 6,254,820 B1 | 7/2001 | Cornell | |
| 6,978,915 B1 | 12/2005 | Russell | |
| 7,028,866 B2 | 4/2006 | Kunesh et al. | |
| 7,168,684 B2 | 1/2007 | Marroncles | |
| 7,234,460 B2 | 6/2007 | Greenleaf | |
| 7,279,207 B2 | 10/2007 | Darr | |
| 7,303,087 B2 | 12/2007 | Flashinski et al. | |
| 7,481,338 B1 | 1/2009 | Stern | |
| 7,769,842 B2 | 8/2010 | Weber | |
| 8,074,847 B2 | 12/2011 | Smith | |
| 8,096,327 B2 | 1/2012 | Hirz | |
| 8,418,996 B2 | 4/2013 | Rideg | |
| 8,505,762 B2 | 8/2013 | Holbach et al. | |
| 8,511,522 B2 | 8/2013 | Chan et al. | |
| 8,631,632 B2 | 1/2014 | Morales et al. | |
| 8,800,824 B2 | 8/2014 | Gañán-Calvo et al. | |
| 8,844,765 B2 | 9/2014 | Tryon | |
| 8,869,842 B2 | 10/2014 | Smith | |
| 8,905,273 B2 | 12/2014 | De Schrijver | |
| 9,061,795 B2 | 6/2015 | Girardot et al. | |
| 9,132,955 B2 | 9/2015 | Smith et al. | |
| 9,174,229 B2 | 11/2015 | Smith | |
| 9,296,550 B2 | 3/2016 | Smith et al. | |
| 9,334,103 B2 | 5/2016 | Soliman | |
| 9,446,894 B2 | 9/2016 | Martz | |
| 9,758,294 B2 | 9/2017 | McDaniel et al. | |
| 9,975,656 B2 | 5/2018 | Smith | |
| 10,029,844 B2 | 7/2018 | Seki | |
| 10,040,622 B2 * | 8/2018 | Dellinger | B65D 83/46 |
| 10,174,884 B2 | 1/2019 | Smith | |
| 10,598,377 B2 | 3/2020 | Crawford et al. | |
| 10,836,562 B2 | 11/2020 | Magness et al. | |
| 11,078,009 B2 | 8/2021 | Cassoni et al. | |
| 2002/0158087 A1 | 10/2002 | Tsutsui et al. | |
| 2003/0071080 A1 | 4/2003 | Yquel | |
| 2003/0230602 A1 | 12/2003 | Smith | |
| 2004/0144803 A1 | 7/2004 | Baker | |
| 2005/0121476 A1 | 6/2005 | Pauls | |
| 2005/0173451 A1 | 8/2005 | Tsutsui | |
| 2009/0001103 A1 | 1/2009 | Wanbaugh | |
| 2009/0014679 A1 | 1/2009 | Hygema et al. | |
| 2009/0261130 A1 | 10/2009 | Pittl et al. | |
| 2010/0224656 A1 | 9/2010 | Scheindel | |
| 2011/0204094 A1 | 8/2011 | Meckstroth et al. | |
| 2011/0248035 A1 | 10/2011 | Peirsman et al. | |
| 2013/0062369 A1 | 3/2013 | Engel | |
| 2013/0200111 A1 | 8/2013 | De | |
| 2013/0228240 A1 | 9/2013 | Noceti | |
| 2014/0048568 A1 | 2/2014 | Demey | |
| 2015/0014990 A1 | 1/2015 | Bodet | |
| 2015/0108387 A1 | 4/2015 | Smith | |
| 2015/0197392 A1 | 7/2015 | Franz | |
| 2015/0375922 A1 | 12/2015 | Smith | |
| 2016/0009482 A1 * | 1/2016 | Martz | B65D 83/48 137/605 |
| 2016/0368633 A1 | 12/2016 | Smith et al. | |
| 2016/0368700 A1 | 12/2016 | Smith | |
| 2016/0377231 A1 * | 12/2016 | Smith | F17C 13/04 251/325 |
| 2017/0152099 A1 | 6/2017 | Dellinger et al. | |
| 2018/0043604 A1 | 2/2018 | Zeik et al. | |
| 2018/0044097 A1 | 2/2018 | Zeik et al. | |
| 2018/0134481 A1 | 5/2018 | Bodet | |
| 2018/0222613 A1 | 8/2018 | Geier | |
| 2018/0333920 A1 | 11/2018 | Cassoni | |
| 2018/0334276 A1 | 11/2018 | Cassoni | |
| 2018/0339841 A1 * | 11/2018 | Magness | B65D 83/62 |
| 2018/0339843 A1 | 11/2018 | Cassoni | |
| 2018/0339844 A1 | 11/2018 | Cassoni | |
| 2019/0077583 A1 | 3/2019 | Weaver | |
| 2019/0077584 A1 | 3/2019 | Magness | |
| 2019/0168242 A1 | 6/2019 | Maguire | |
| 2019/0276221 A1 | 9/2019 | Franckhauser | |

FOREIGN PATENT DOCUMENTS

| | | |
|---|---|---|
| CN | 101883726 A | 11/2010 |
| CN | 103442996 A | 12/2013 |
| CN | 107787423 A | 3/2018 |
| CN | 109715525 A | 5/2019 |
| EP | 2253809 B1 | 3/2012 |
| WO | WO9108099 A1 | 6/1991 |
| WO | WO0110743 A1 | 2/2001 |
| WO | WO2017021039 A1 | 2/2017 |

OTHER PUBLICATIONS

U.S. Appl. No. 16/914,519, filed Jun. 29, 2020, David Andrew Dalton, et al.
U.S. Appl. No. 16/914,523, filed Jun. 29, 2020, David Andrew Dalton, et al.
U.S. Appl. No. 16/914,527, filed Jun. 29, 2020, David Andrew Dalton, et al.
U.S. Appl. No. 16/914,509, filed Jun. 29, 2020, Robert Paul.
U.S. Appl. No. 16/914,510, filed Jun. 29, 2020, Robert Paul.
International Search Report and Written Opinion; Application No. PCT/US2020/070205; dated Sep. 8, 2020, 14 pages.
EP Search Report; Application No. 19160210.1; dated Aug. 1, 2019; 12 pages.
All Office Actions, U.S. Appl. No. 15/912,643.
All Office Actions; U.S. Appl. No. 16/914,510.
All Office Actions; U.S. Appl. No. 16/914,519.
All Office Actions; U.S. Appl. No. 16/914,523.
All Office Actions; U.S. Appl. No. 16/914,527.
Ex Parte Qualye Action; U.S. Appl. No. 16/914,510 dated Aug. 2, 2022; 5 pages.
Non Final Office Action; U.S. Appl. No. 16/914,519 dated May 6, 2022; 11 pages.
Non Final Office Action; U.S. Appl. No. 16/914,523 dated May 9, 2022; 8 pages.

(56) References Cited

OTHER PUBLICATIONS

Non Final Office Action; U.S. Appl. No. 16/914,527 dated Sep. 1, 2022; 9 pages.

* cited by examiner

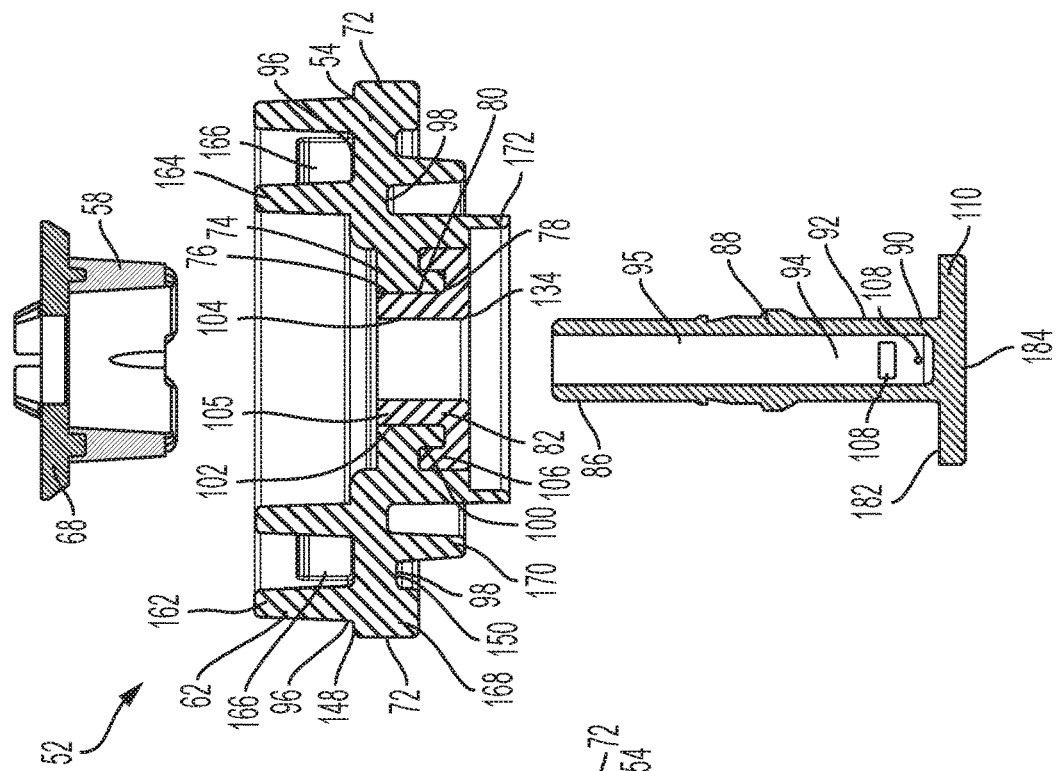
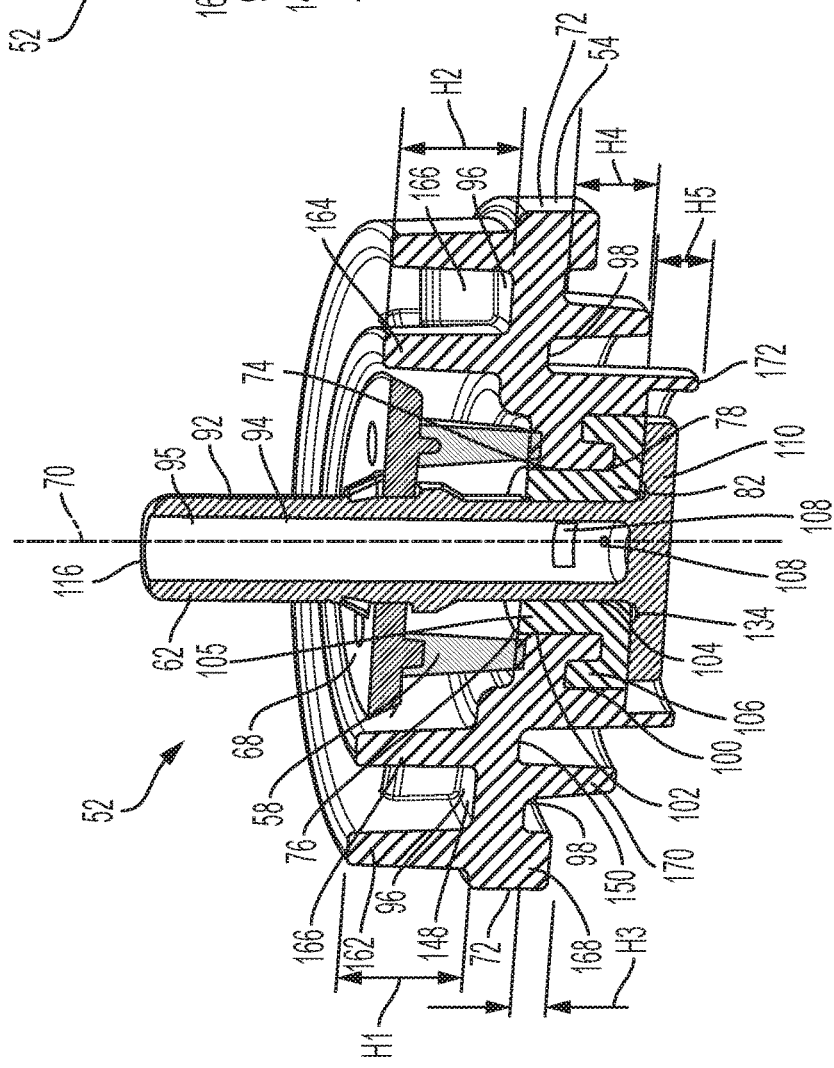
FIG. 6B
FIG. 6A

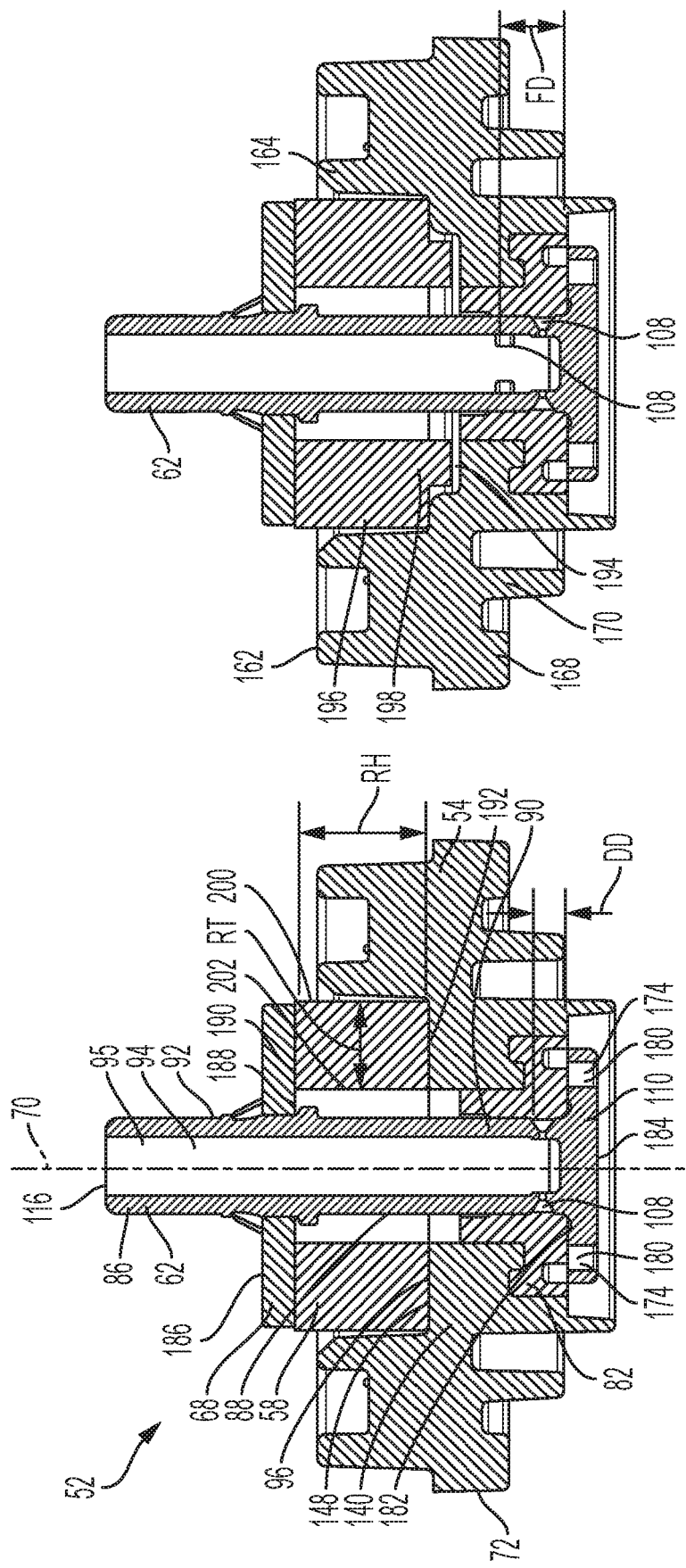

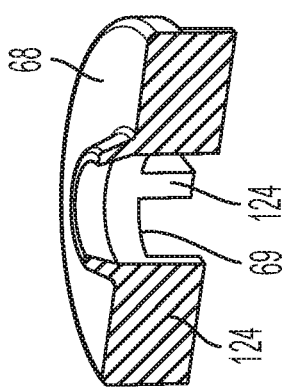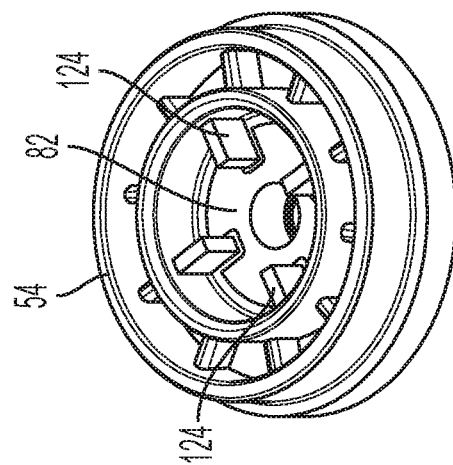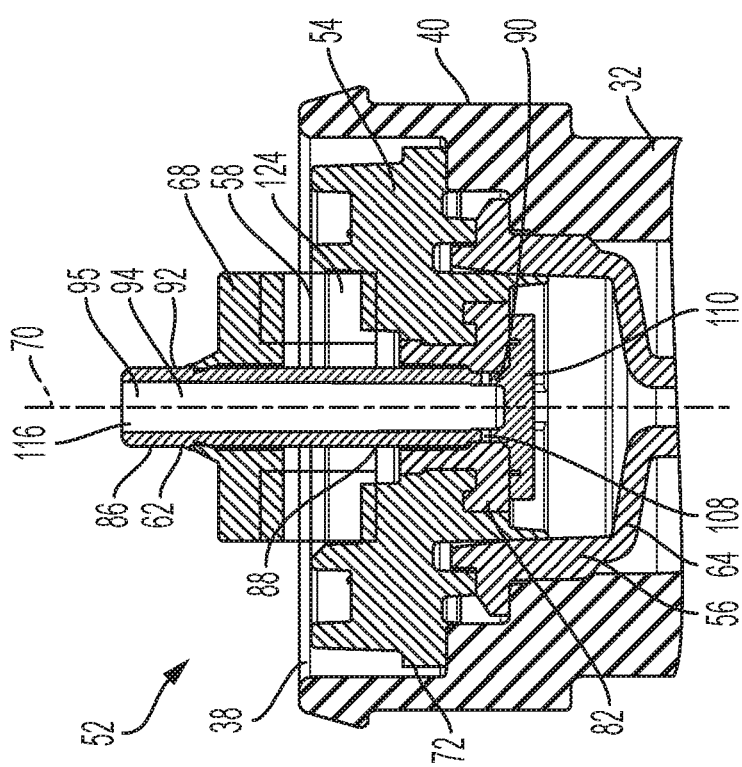

VALVE ASSEMBLY FOR DISPENSERS

FIELD

The present disclosure is directed to a valve assembly, and, in particular, to a polymeric valve assembly that may be used in a dispenser.

BACKGROUND

Dispensers typically include a container, which may act as a pressure vessel for propellant and product contained therein. Pressurized dispensing systems, such as systems used to dispense aerosol products, have conventionally included metallic (e.g., steel or aluminum) containers for containing the product under pressure before it is dispensed from the system. Examples of products that are dispensed with such systems include air fresheners, fabric fresheners, insect repellants, paints, body sprays, hair sprays, shoe or footwear spray products, whipped cream, and processed cheese. Recently, there has been increased interest in using polymeric bottles as an alternative to metallic containers in pressurized dispensing systems because polymeric bottles have several potential advantages. For example, polymeric bottles may be easier and cheaper to manufacture than metallic containers, and polymeric bottles may be made in a wider variety of shapes than metallic containers. Additionally, metal containers may be undesirable due to relatively higher cost and being relatively less sustainable.

The containers are typically, but not necessarily, cylindrical. The container may include a closed end bottom for resting on horizontal surfaces such as shelves, countertops, tables etc. The bottom of the container may comprise a re-entrant portion or base cup. The sidewalls define the shape of the container and extend upwardly from the bottom to an opening at a top of the container. The opening at the top of the container defines a neck.

Typically, a valve assembly 8 may be joined to a container to allow for selective dispensing of a product. With reference to FIG. 1, the valve assembly 8 may include a metal valve cup 10 inserted at least partially into the neck of the container. The valve cup 10 is crimped against a crimp ring of a container to seal the container and prevent the escape of propellant, product, and loss of pressurization. The valve cup 10 may define a central opening about through which a stem may extend. Positioned between a portion of the stem 14 and the valve cup 10 may be a gasket 16. The gasket 16 made be made from an elastomer, and traditionally, a cross linked elastomer, such as cross-linked vulcanized rubbers. The gasket 16 may be used to seal the interface between the valve cup 10 and the stem 14. The stem 18 may extend through the central opening in the valve cup 10 and engage a portion of the gasket 16. The portion of the stem that extends from the central opening of the valve cup towards the bottom of the outer contain may engage a housing 12 and a spring 20. The portion of the stem 18 may push the spring 20 towards the bottom of the container to allow product to pass from the container and into the interior of the stem and out through the actuator 18. Upon release of the actuator 18, the spring may push the actuator in a direction away from the bottom of the container, which stops the release of material from inside the container to ambient. The spring 20 is typically made from metal. The spring 20 is supported by the housing 12.

To selectively dispense product from an aerosol dispenser, the valve assembly includes a number of different components. These components are made from a number of different materials including metal and polymeric, which may be plastic, components. However, for producing an aerosol dispenser that is both recyclable and economical, it is desirable to have all the components made from materials that may be recycled, such as being accepted into a single recycling stream, or to minimize the number of component parts made from other than polymeric materials.

SUMMARY

In some embodiments, a valve for a dispenser includes a valve body. The valve body includes an outer surface and an inner passageway extending about a longitudinal axis. The inner passageway includes a first passageway opening and a second passageway opening and a passageway surface extending from the first passageway opening to the second passageway opening. The valve body includes a first valve body surface and a second valve body surface opposite the first valve body surface. The first valve body surface includes an upper portion extending from the outer surface toward the longitudinal axis and a lower portion extending from the inner passageway toward the outer surface. The valve also includes a valve stem extending through the inner passageway. The valve stem includes an outer stem surface and an inner stem surface opposite the outer stem surface. The inner stem surface defines a channel. The valve may also include a resilient member disposed on at least a portion of the first valve body surface. The resilient member is made from a resilient polymeric material and has a non-linear compression profile.

BRIEF DESCRIPTION OF THE DRAWINGS

Several figures are provided to help the reader understand the invention. The figures are intended to be viewed in conjunction with the specification and are not intended to be limiting beyond that of the wording of the specification. Reference numbers are used to identify different features of the figures. The same reference numbers are used throughout the specification and drawings to show the same features, regardless of the variation of the invention that is depicted.

FIG. 6A is a perspective, sectional view of a valve assembly.

FIG. 6B is a side, exploded, sectional view of a valve assembly.

FIG. 11 is a side, sectional view of a valve assembly.

FIG. 12 is a side, section view of a valve assembly

FIG. 16A is a sectional, side view of a valve assembly including a force concentrator member and an engagement member including one or more force concentrators.

FIG. 16B is a perspective, sectional view of a force concentrator member including one or more force concentrators.

FIG. 16C is a perspective view of a valve body including one or more force concentrators and a valve seal.

DETAILED DESCRIPTION

Figure 1:
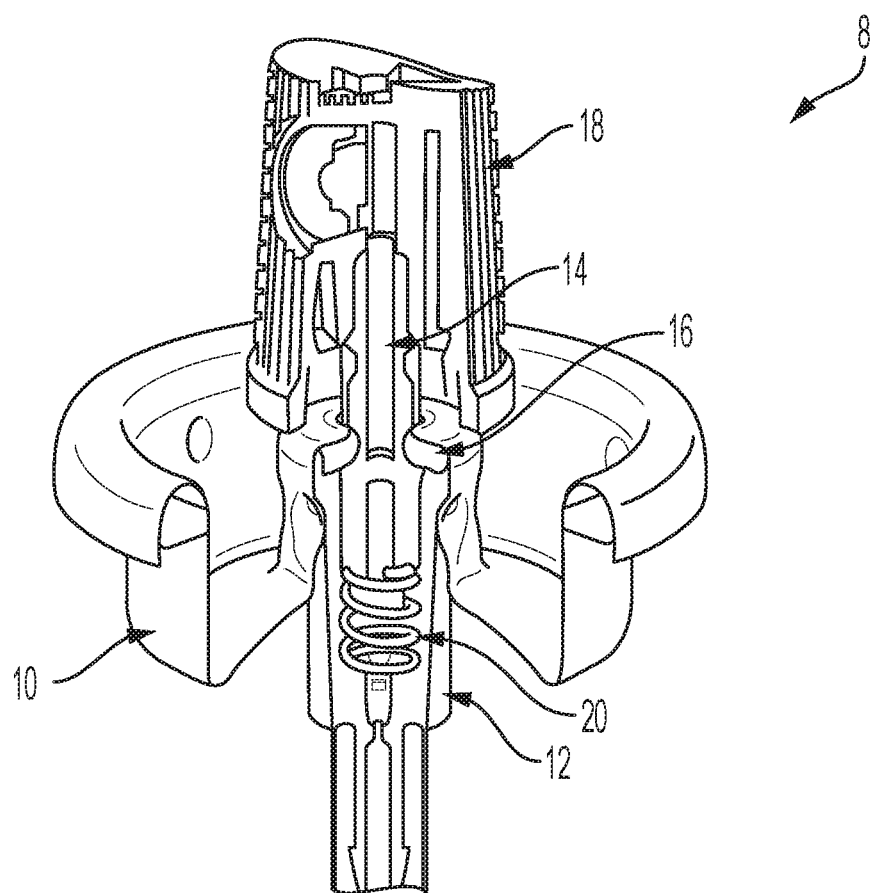
FIG. 1 is a sectional view of a prior art, industry standard valve assembly including a metal valve cup.
Figure 2B:
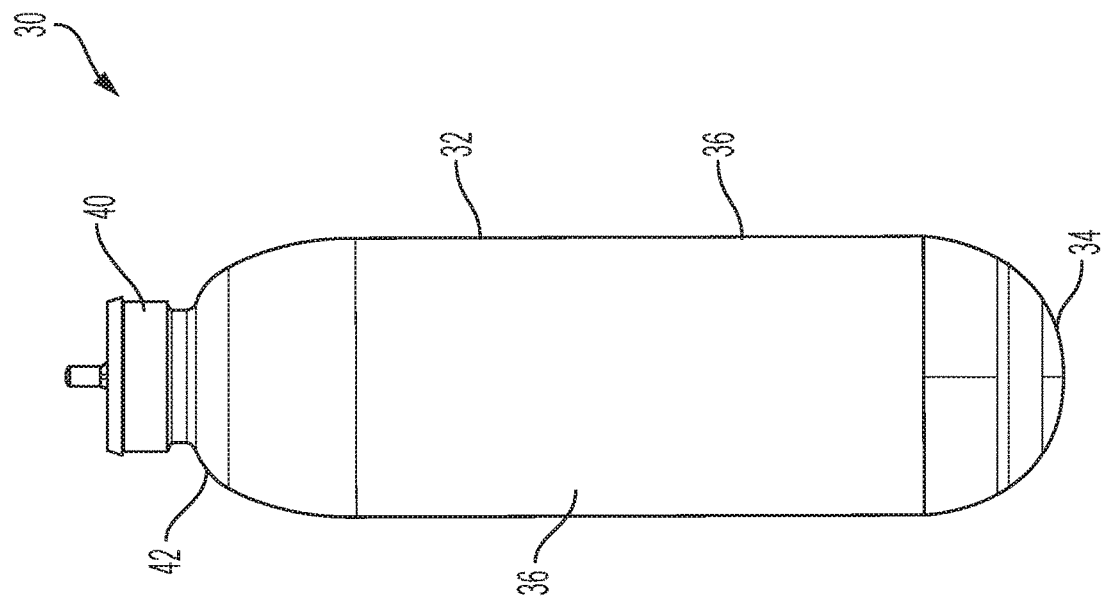
FIG. 2B is a side view of an aerosol dispenser.
Figure 2A:
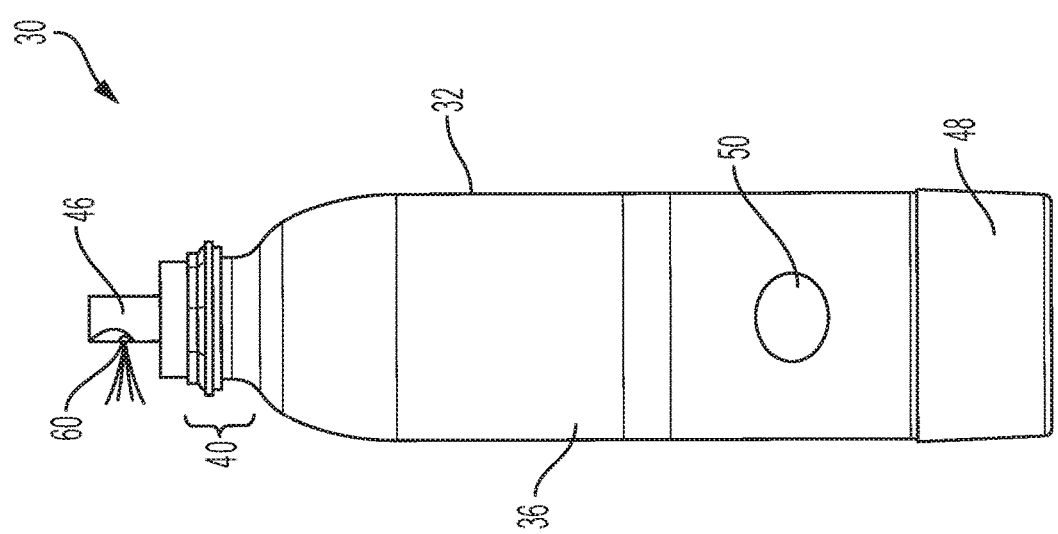
FIG. 2A is a side view of an aerosol dispenser.

The present disclosure is directed to valve assembly and, more specifically, a valve assembly for a dispenser. The present disclosure describes the valve assembly used in an aerosol dispenser. However, the valve assembly may be used in a non-pressurized dispenser. An aerosol dispenser may include a container for containing a product and a propellant and a valve assembly for dispensing the product or the product and the propellant from the container. Other components may be included in the aerosol dispenser such as a nozzle for controlling the spray characteristics of a product as it discharged from the aerosol dispenser and an actuator for selectively dispensing product from the aerosol dispenser. Products may include, but are not limited to: shave cream, shave foam, body sprays, body washes, perfumes, hair cleaners, hair conditions, hair styling products, antiperspirants, deodorants, personal and household cleaning or disinfecting compositions, air freshening products, fabric freshening products, hard-surface products, astringents, foods, paint, pharmaceuticals, and insecticides. The relatively large number of products that may be dispensed using aerosols has made aerosols a popular choice among manufacturing companies. The relative popularity of aerosol dispensers has resulted in companies considering cost cutting measures with respect to aerosol dispensers and to consider materials, at least in part, for aerosol dispensers to minimize the environmental impact.

For example, an aerosol dispenser made from polymeric components may aid in the recyclability of the dispensers and help with reducing cost, such as by reducing the cost of manufacturing, eliminating expensive metal components, and reducing the cost of shipping, through weight reduction of each dispenser. The use of different materials also allows for greater flexibly in the size and shape of the dispenser. The present disclosure is directed to a valve that includes a valve assembly that may be accepted into a single recycling stream, such as the PET (polyethylene terephthalate) recycling stream, and safely vents at relatively excessive temperatures and/or pressures.

With reference to FIGS. 2A, 2B, 3A, and 3B, an aerosol dispenser 30 may include a container 32, a valve assembly 52 (also referred to herein as a valve), a product delivery device 56, an actuator 46, and a nozzle 60. The container 32 may include a base cup 48 joined thereto and indicia 50 disposed on, for example, the sidewalls 36 of the container 32. The valve assembly 52 may be joined to a portion of the container 32. By joined includes directly or indirectly joined. Joined includes removably joined and fixedly joined. Joined includes both mechanical attachment, such as by screws, bolts, interference fit, friction fit, welding, and integrally molding, and chemical attachment, such as by adhesive or the adhesive properties inherent in the materials being attached. The valve assembly 52 may be joined to the container such that a portion of the valve assembly 52 is disposed within the container. The product delivery device 56 may be joined to at least one of a portion of the container 32 and a portion of the valve assembly 52 and the product delivery device may be in fluid communication with the actuator 46 and the nozzle 60.

A base cup 48 may be joined to the bottom portion, which is opposite the valve assembly 52, of the container 32 and may be used, for example, to aid in positioning the dispenser on flat surfaces and to reinforce the bottom 34 of the aerosol dispenser. The container 32 may be configured to hold product and/or propellant. The product delivery device may be disposed at least partially within the container and the valve may be joined to the container 32 and may be in operative communication with the product delivery device. The product and/or the propellant may be stored in the container 32. Upon being dispensed, the product and/or propellant may travel from and/or through the product delivery device 56 and through the valve assembly 52.

The valve assembly 52 may be in fluid communication with a nozzle 60. The nozzle 60 directs product out of the aerosol dispenser and into the environment or onto a target surface. The nozzle may be configured in various different ways depending upon the desired dispensing and spray characteristics. The actuator 46 may be engaged by a user and is configured to initiate and terminate dispensing of the product and/or propellant. Stated another way, the actuator provides selective dispensing of the product and/or propellant. The actuator 46 may be depressible, operable as a trigger, push-button, and the like, to cause release of a product from the aerosol dispenser 30. The actuator 46 may include a connector such as a male or female connector, snap-fit connector, or the like to secure the actuator to the container. It is to be appreciated that to dispense product, the aerosol dispenser does not need to include an actuator and a nozzle. The product and/or propellant may be dispensed from the stem.

The container 32 may be used to hold product and/or propellant. The container 32 may be any shape that allows product and/or propellant to be held within the interior of the container. For example, the container may be peanut-shaped, oval-shaped, or rectangular-shaped. It is to be appreciated that the container 32 may be molded, which allows for any number of shapes to be used. The container 32 may be longitudinally elongate such that the container has an aspect ratio of a longitudinal dimension to a transverse dimension, such as diameter. The aspect ratio may be greater than 1, equal to 1, such as in a sphere or shorter cylinder, or an aspect ratio less than 1. The containers 32 may be cylindrical.

The container 32 may include a closed bottom 34, one or more sidewalls 36, and a neck 40. The one or more sidewalls 36 may extend between the closed bottom 34 and the neck 40. The sidewalls 36 generally define the shape of the container 32. A shoulder 42 may be included between the neck 40 and the one or more sidewalls 36. The neck 40 of the container 32 may define an opening 38. The opening 38 may be opposite the bottom 34 of the container 32. The neck 40 and/or shoulder 42 may have a uniform or varying thickness in order to achieve a desired strength in these regions of the container 32.

The bottom 34 of the container 32 may be configured for resting on horizontal surfaces such as shelves, countertops, tables etc. The bottom 34 of the container 32 may include a re-entrant portion or base cup 48. The base cup 48 may be joined to the bottom 34 of the container 32 and may aid in reinforcement of the bottom 34 and/or may allow the container to rest on horizontal surfaces. The container 32 may not include a base cup and may be configured to sit on at least a portion of the bottom 34. Suitable shapes of the bottom 34 include petaloid, champagne, hemispherical, or other generally convex or concave shapes. Each of these shapes of the bottom 34 may be used with or without a base cup 48. The container 32 may have a generally flat base with an optional punt.

The container 32 may be polymeric. The container 32 may include polyethylene terephthalate (PET), polyethylene furanoate (PEF), polyester, nylon, polyolefin, EVOH, or mixtures thereof. The container may be a single layer or multi-layered. The container 32 may be injection molded or blow molded, such as in an injection-stretch blow molding process or an extrusion blow molding process.

The container 32 may be axisymmetric as shown, or, may be eccentric. The cross-section may be square, elliptical, irregular, etc. Furthermore, the cross section may be generally constant as shown, or may be variable. For a variable cross-section, the container may be, for example, barrel shaped, hourglass shaped, or monotonically tapered.

The container 32 may range from about 6 cm to about 60 cm, or from about 10 cm to about 40 cm in height, taken in the axial direction. The container 32 may have a cross-section perimeter or diameter, if a round cross-section is selected, from about 3 cm to about 60 cm, or from about 4 cm to about 10 cm. The container may have a volume ranging from about 40 cubic centimeters to about 1000 cubic centimeters exclusive of any components therein, such as a product delivery device 56.

At 21° C., the container 32 may be pressurized to an internal gage pressure of about 100 kPa to about 1500 kPa, or from about 110 kPa to about 1300 kPa, or from about 115 kPa to about 490 kPa, or about 270 kPa to about 420 kPa using a propellant. An aerosol dispenser 30 may have an initial propellant pressure of about 1500 kPa and a final propellant pressure of about 120 kPa, an initial propellant pressure of about 900 kPa and a final propellant pressure of about 300 kPa, or an initial propellant pressure of about 500 kPa and a final propellant pressure of 0 kPa, including any values between the recited ranges.

The propellant may include hydrocarbons, compressed gas, such as nitrogen and air, hydro-fluorinated olefins (HFO), such as trans-1,3,3,3-tetrafluoroprop-1-ene, and mixtures thereof. Propellants listed in the US Federal Register 49 CFR 1.73.115, Class 2, Division 2.2 may be acceptable. The propellant may be condensable. A condensable propellant, when condensed, may provide the benefit of a flatter depressurization curve at the vapor pressure, as product is depleted during usage. A condensable propellant may provide the benefit that a greater volume of gas may be placed into the container at a given pressure. Generally, the highest pressure occurs after the aerosol dispenser is charged with product but before the first dispensing of that product by the user.

Figure 3B:
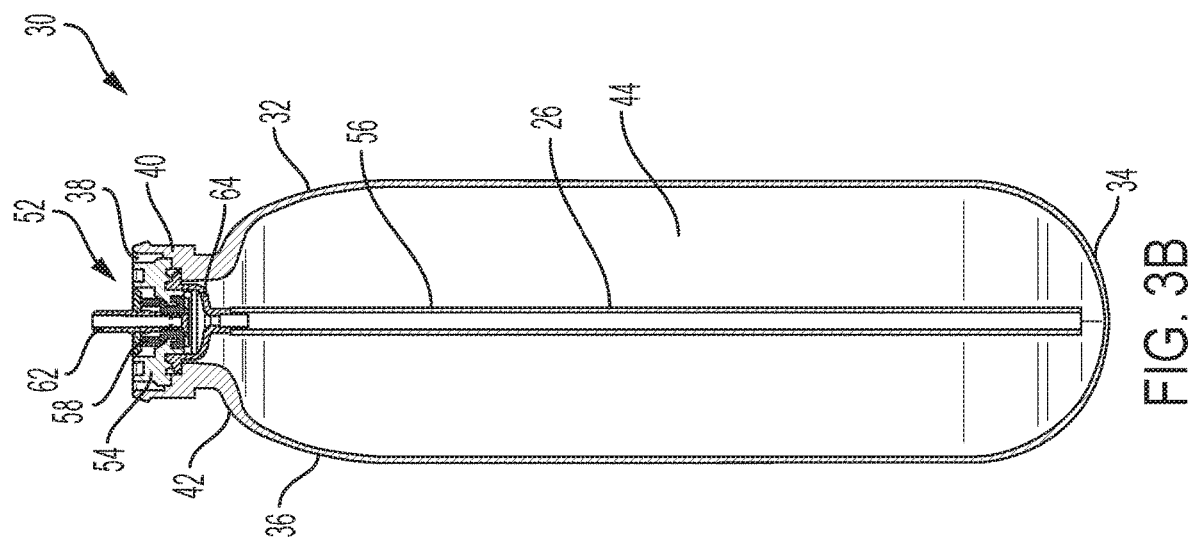
FIG. 3B is a sectional view of an aerosol dispenser including a dip tube.
Figure 3A:
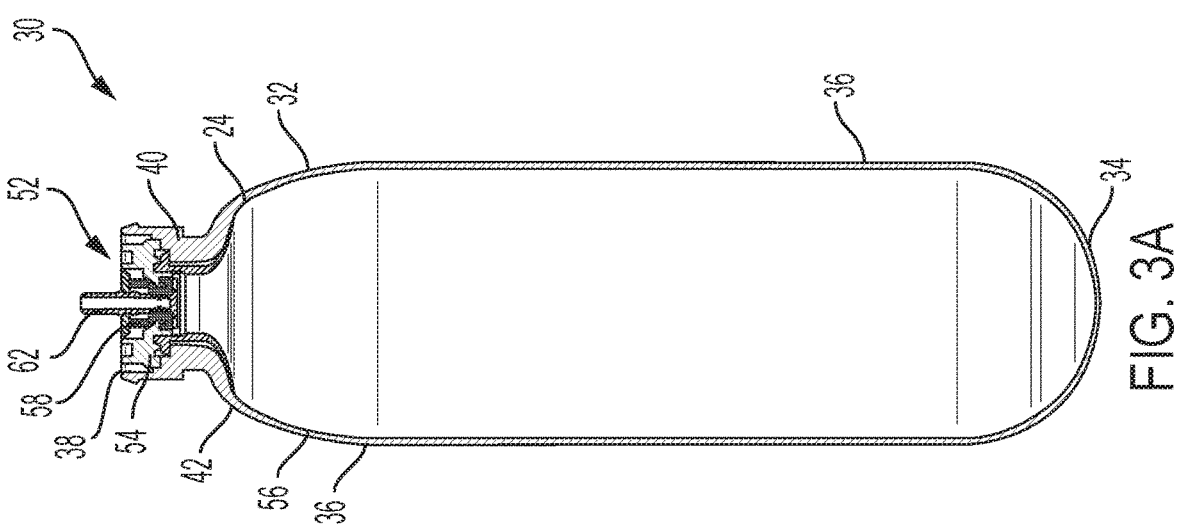
FIG. 3A is a sectional view of an aerosol dispenser including a bag.

The product delivery device 56 may be used to contain and/or provide for delivery of product and/or propellant from the aerosol dispenser 30 upon demand. Suitable product delivery devices 56 comprise a piston, a bag 24, or a dip tube 26, such as illustrated in FIGS. 3A and 3B. The product delivery device 56 may include polyethylene terephthalate (PET), polypropylene (PP), polyethylene furanoate (PEF), polyester, nylon, polyolefin, EVOH, or mixtures thereof. The container may be a single layer or multi-layered. The bag 24 may be disposed within the container 32 and be configured to hold a product therein, such as illustrated in FIG. 3A. Propellant may be disposed within the container 32 and between the container and the bag 24. A portion of the bag 24 may be joined to at least one of the container 32 and a portion of the valve assembly 52, such as the valve body 54. The bag 24 may be positioned between the container 32 and the valve body 54. The bag 24 may be inserted into the container 32 and subsequently joined thereto. The bag 24 may be joined to the valve body 54, and the valve body 54 joined to the bag 24 may be subsequently inserted into the container 32.

As illustrated in FIG. 3B, the dispenser may include a dip tube adaptor 64 and a dip tube 26. The dip tube adaptor 64 may be disposed within the container 32. The dip tube adaptor 64 may engage a portion of the neck 40. The dip tube 26 may be joined to the dip tube adaptor 64 and extend from the dip tube adaptor 64 toward the bottom 34 of the container 32. It is to be appreciated that the dip tube 26 may be attached directly to a portion of the valve assembly, such as the valve body 54. The dip tube 26 and/or the dip tube adaptor 64 may be attached to the valve body 54 prior to being disposed within the container. The dip tube 26 and/or the dip tube adaptor 64 may be disposed within the container and then subsequently joined to a portion of the container and/or the valve body 54.

The product delivery device 56 may include a metering device for dispensing a pre-determined, metered quantity of product. The product delivery device 56 may include an inverting valve such as a valve including a ball therein to alter the path of product flow. The product delivery device 56 may include a dip tube disposed in a bag. The product delivery device 56 may be polymeric.

Figure 3C:
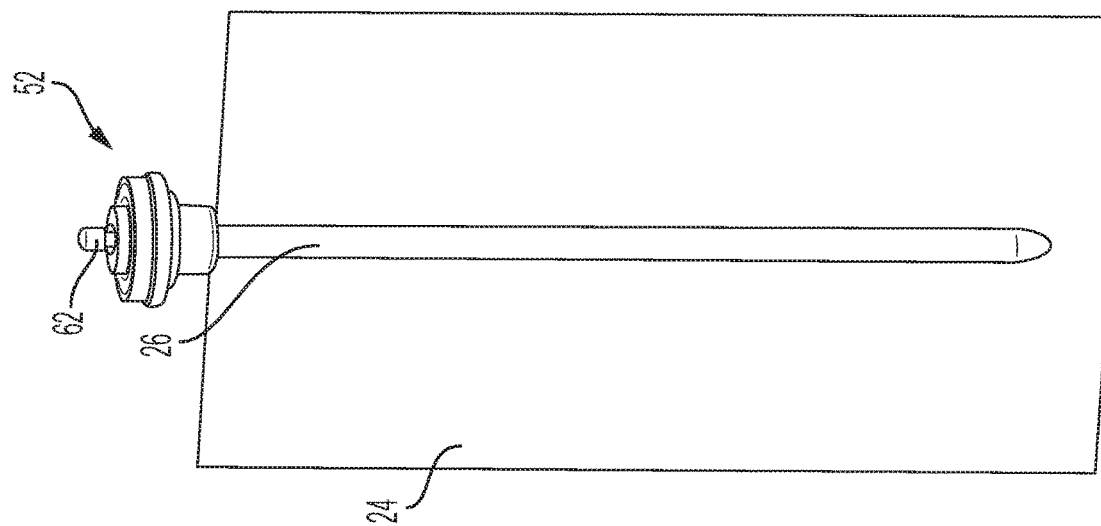
FIG. 3C is a sectional view of an aerosol dispenser including a bag and a dip tube.
Figure 3D:
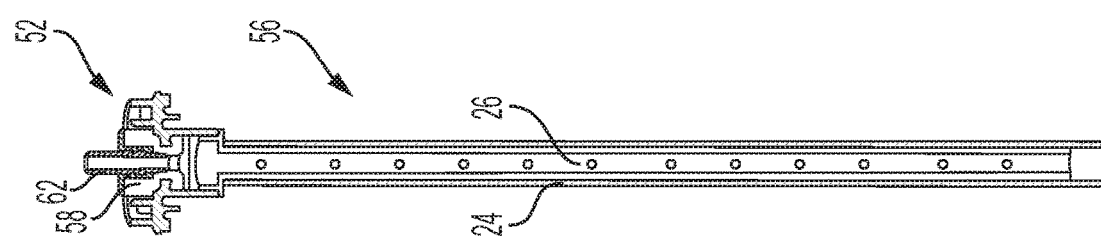
FIG. 3D is a sectional view of a dip tube joined to a valve assembly and a bag wrapped about the dip tube.
Figure 3E:
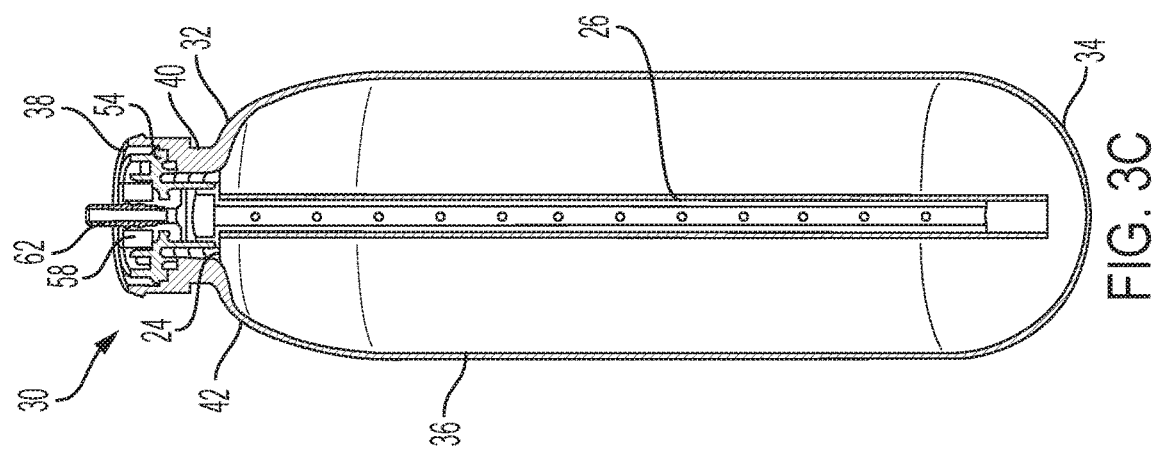
FIG. 3E is a perspective view of a dip tube joined to a valve assembly and an extended bag.

Referring to FIGS. 3C-3E, the product delivery device 56 may include a dip tube 26 and a bag 24. The bag 24 may be attached to a portion of the dip tub 26 and the dip tube may be disposed within the bag 24. The dip tube 26 may include one or more orifices through which product may flow. A portion of the dip tube 26 may be joined to a portion of the valve assembly 54. A portion of the dip tube 26 may be joined to a portion of the valve body 54. The dip tube 26 may be joined to a portion of the valve body 54 by friction fit, snap fit, chemical attachment, such as by adhesive, or mechanical attachment, such as by a screw or nail. Prior to the valve assembly 52, the dip tub 26, and the bag 24 being joined to the container 32, the bag 24 may be wrapped about the dip tub 26, such as illustrated in FIG. 3D, or collapsed in some other manner such that the bag 24 does not interfere as the dip tube 26 and bag 24 are inserted into the container 32. Once the bag 24 and dip tube 26 are disposed within the container 32, the bag 24 may expand within the container.

The container 32 and/or the product delivery device 56 may be transparent or substantially transparent. This arrangement provides the benefit that the consumer knows when product is nearing depletion and allows improved communication of product attributes, such as color, viscosity, etc. Also, indicia disposed on the container, such as labeling or other decoration of the container, may be more apparent if the background to which such decoration is applied is clear. Labels may be shrink wrapped, printed, etc., as are known in the art.

The container 32 may include a neck 40. The neck 40 may define an opening 38 and be configured to receive a valve assembly 52. The valve assembly 52 may be disposed on or inserted, at least partially, into the opening 38 of the neck 40 of the container 32, such as illustrated in FIGS. 3A, 3B, and 3C. The valve assembly 52 may include a valve body 54, a valve stem 62, and a resilient member 58. At least a portion of the valve assembly 52 may be movable in relationship to the balance of the aerosol dispenser in order to open and close the aerosol dispenser for dispensing product. The valve assembly 52 may be opened due to movement of the valve stem 62 which may be through use of an actuator 46 or through manual or other mechanical depression of the valve stem 62. When the valve 52 is opened, for example, by way of the actuator 46, a flow path is created for the product to be dispensed through a nozzle 60 to ambient or a target surface. The valve assembly 52 may be opened, for example, by selective actuation of the actuator 46 by a user.

A portion of the valve body 54 may be sealed to the neck of the container 32, such as illustrated in FIGS. 3A, 3B, and 3C, to prevent the escape of product and/or propellant. The valve body 54 may be sealed to the container 32 utilizing a press fit, interference fit, crimping, solvent welding, laser welding, sonic welding, ultrasonic welding, spin welding, adhesive or any combination thereof, so long as a seal adequate to contain the product and/or to maintain the pressure results. The valve body 54 may be joined to the container 32 such that at least a portion of the valve body 54 is disposed within the container 32. The valve body 54 may be joined to the container 32 such that the valve body 54 is joined to the opening of the neck and the valve body 54 is disposed on top of the neck.

Figure 4A:
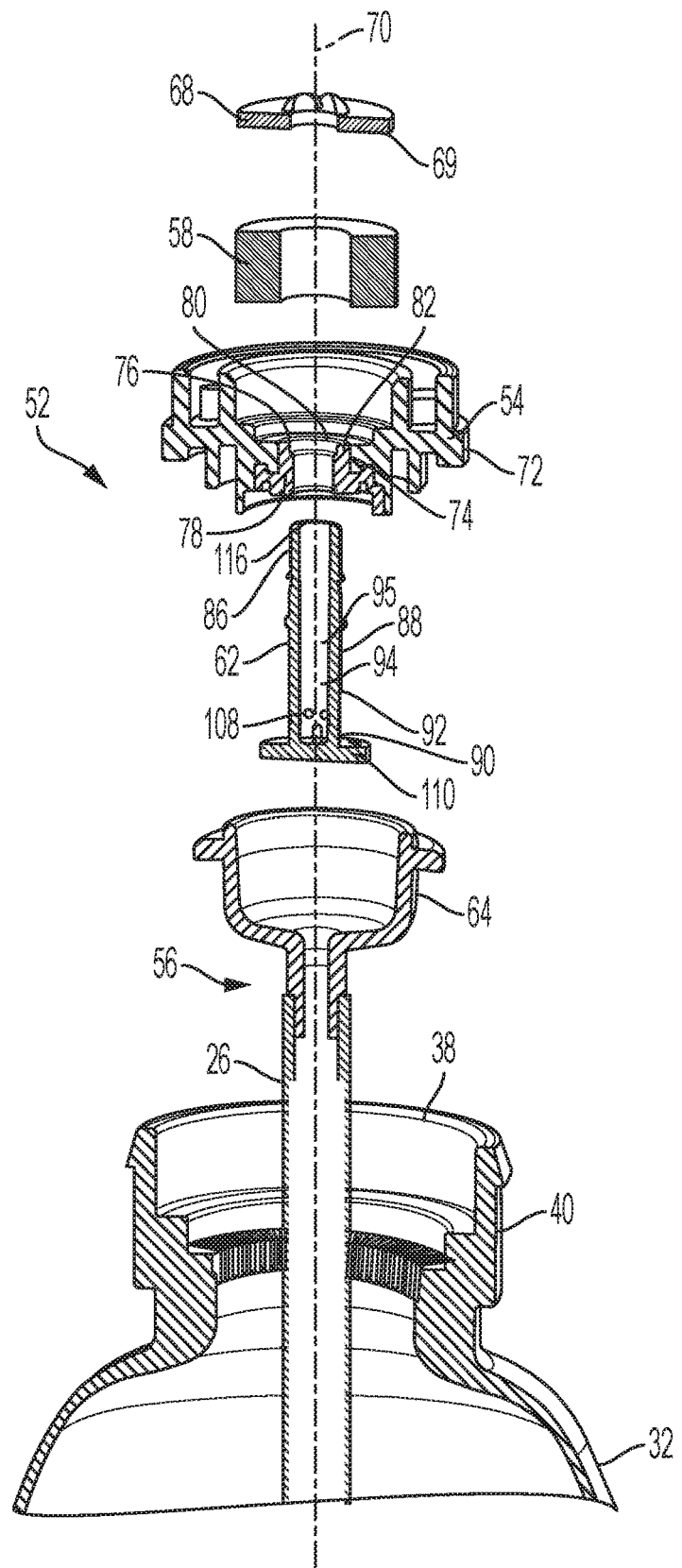
FIG. 4A is a partial, exploded, sectional view of a valve assembly, a product delivery device, and a container.
Figure 4B:
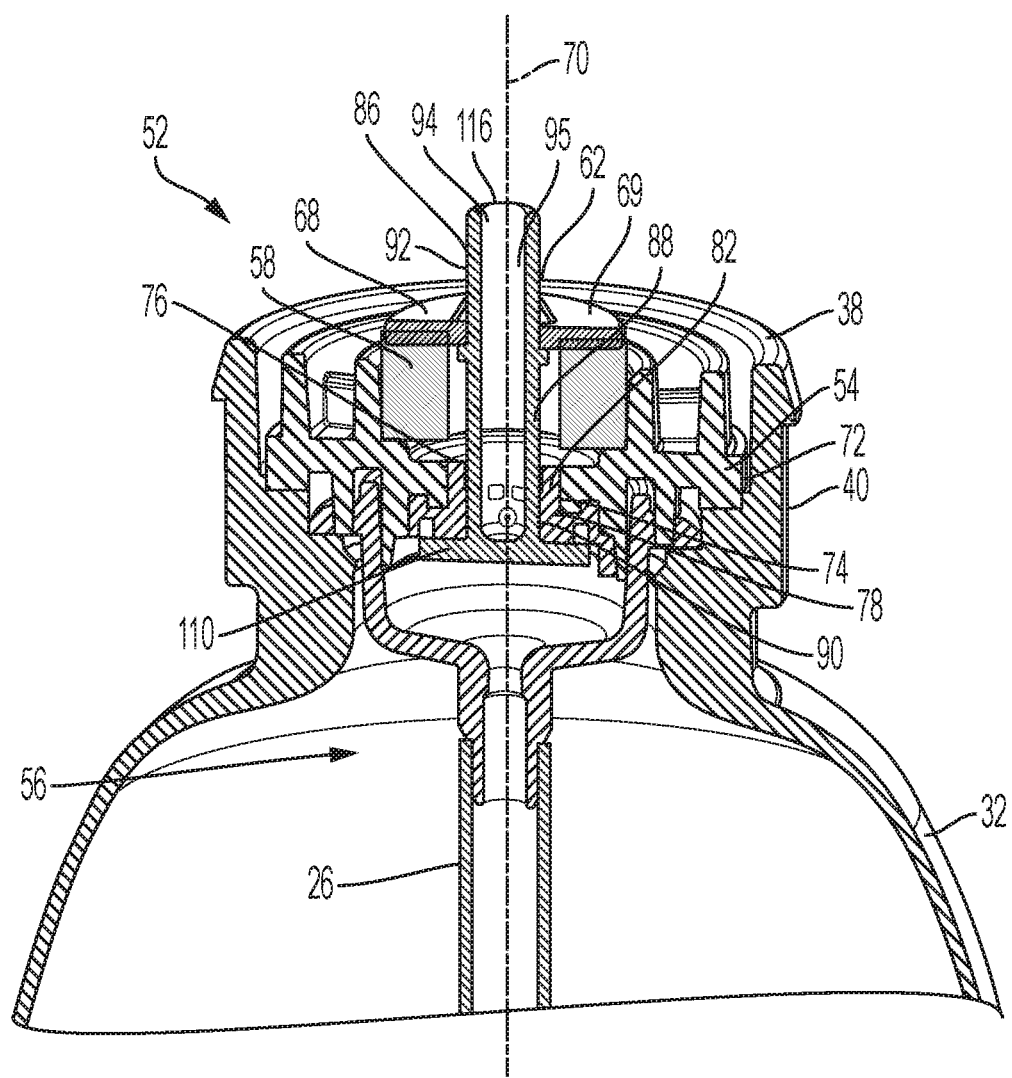
FIG. 4B is a partial, section view of a valve assembly, a product delivery device, and a container.

As illustrated in FIGS. 4A and 4B, the valve body 54 may extend about a longitudinal axis 70. The valve body 54 may include an outer surface 72 and define an inner passageway 74. The outer surface 72 may include the surface positioned farthest from the longitudinal axis 70. The outer surface 72 may extend about the longitudinal axis 70. The inner passageway 74 may include a first passageway opening 76 and a second passageway opening 78 and a passageway surface 80 extending from the first passageway opening 76 to the second passageway opening 78. The passageway surface 80 may substantially surround the longitudinal axis 70.

A valve stem 62 may extend through the inner passageway 74 of the valve body 54. The valve stem 62 provides a product flow path from the interior of the container to the nozzle 60 and operatively joins the actuator 46 to the valve assembly 52. The valve stem 62 may be positioned with respect to the valve body 54 in a sealing configuration, also referred to herein as a sealed configuration, such that an upper portion 86 of the valve stem 62 is adjacent to the first passageway opening 76 of the valve body 54, a second portion 88 of the valve stem 62 may be substantially surrounded by the passageway surface 80, and a third portion 90 of the valve stem 62 may be adjacent to the second passageway opening 78 of the valve body 54. The valve stem 62 may be positioned with respect to the valve body 54 in a sealing configuration such that an upper portion 86 of the valve stem 62 extends through the first passageway opening 76 of the valve body 54, a second portion 88 of the valve stem 62 may be substantially surrounded by the passageway surface 80, and a third portion 90 of the valve stem 62 may extend through the second passageway opening 78 of the valve body 54. The valve stem 62 may be moveable with respect to the valve body 54, for example between a sealing configuration and/or a dispensing configuration and/or a filling configuration. Thus, the valve stem 62 may be positioned in other configurations as the valve stem 62 moves. The valve stem 62 may include an outer stem surface 92 and an inner stem surface 94 opposite the outer stem surface. The inner stem surface 94 may define a channel 95 through which product and/or propellant may flow either out from or into the container. The valve stem 62 may include a dispensing opening 116 that may be used to introduce propellant and/or product into the container or dispense product and/or propellant from the container.

The valve assembly 52 may include a valve seal 82, such as illustrated in FIGS. 4A and 4B. The valve seal may be disposed on at least a portion of the passageway surface 80 and may extend about a portion of the passageway surface 80. The valve seal may be joined to the passageway surface 80 such that the valve seal remains in position as the valve stem 62 moves from the sealing configuration to a dispensing configuration or a filling configuration. The valve seal may extend from the passageway surface 80 toward the second passageway opening 78. The valve seal 82 may extend about the second passageway opening 78. The valve seal 82 may extend from the passageway surface 80 to the first passageway opening 76. The valve seal 82 may extend about the second passageway opening 78 without extending from the passageway surface 80. The valve seal 82 may be any shape such that a seal is formed with a portion of the valve stem 62 and product and/or propellant is contained within the container.

The valve assembly 52 may include a resilient member 58. The resilient member 58 may be disposed on a portion of the valve body 54. The resilient member 58 may be positioned adjacent to the first passageway opening 76 and substantially surround the longitudinal axis 70. The resilient member 58 may be any compliant member that provides resistance to a force providing movement of the valve stem 62 when the valve stem 62 is moved in a direction toward the container 32, such as to a dispensing configuration or a filling configuration, and returns the valve stem 62 to a sealing configuration when the force is removed or lessened. The resilient member 58 may be made from at least one of a metal and a polymer. The resilient member 58 may be any shape such that the resilient member 58 operatively engages the valve stem and controls the movement of the valve stem.

The valve assembly 52 may include an engagement member 68. The engagement member 68 may be joined to a portion of the valve stem 62 such that the engagement member 68 moves as the valve stem 62 moves. The engagement member 68 may extend from the outer stem surface 92 towards the outer surface 72 of the valve body 54. The engagement member 68 may be axisymmetric or non-axisymmetric. The engagement member 68 includes an engagement surface 69. The engagement surface 69 is configured to operatively engage a portion of the resilient member 58. The resilient member 58 may be positioned between the engagement surface 69 and a portion of the valve body 54. When the valve stem 62 is in a sealing configuration, the engagement surface 69 may operatively engage the resilient member 58 such that the resilient member 58 is placed under a desired amount of compression which biases the valve stem 62 to remain in a positioned such that a seal is maintained. When the valve stem 62 is in a dispensing configuration, a user or other mechanical device may overcome an additional compression force of the resilient member to move the valve stem 62 from the sealing configuration to the dispensing configuration. As the valve stem 62 moves from the sealing configuration to the dispensing configuration, the engagement member 68 compresses the resilient member 58. It is also to be appreciated that the resilient member 58 may be further compressed to move the valve stem 62 from a dispensing configuration to a filling configuration, which will be disused in more detail herein.

The valve stem 62 may include one or more orifices 108. The orifices 108 may be used for filling the container with product and/or propellant and dispensing product and/or propellant from the container. The one or more orifices 108 may be any shape or size so long as product and/or propellant may be at least one of filled and dispensed through such orifice. For example, the one or more orifices may be circular, oval, rectangular, square, or any other shape. The one or more orifices 108 may be tapered. For a valve stem 62 including two or more orifices, each of the orifices may be the same or different shapes and may be the same or different sizes. For example, when both a dispensing orifice and a filling orifice are included in the valve stem 62, the filling orifice may have a larger cross-sectional open area than the dispensing orifice. The orifice 108 may extend from the outer stem surface 92 to the inner stem surface 94. The orifice 108 may be in fluid communication with the channel 95 defined by the inner stem surface 94 such that product and/or propellent may flow through the orifice and into the channel 95. The product and/or propellant may flow from the container, through the orifice, and into the channel 95. The product and/or propellant may also flow through the channel, through the orifice, and into the container.

The one or more orifices 108 may be positioned about the valve stem 62 such that the release of product and/or propellant is controlled. The orifice 108 may be positioned between the first portion 86 of the valve stem 62 and at least a portion of the valve seal 82. Stated another way, the one or more orifices 108 may be positioned such that at least a portion of the valve seal 82 is located between the orifice and the third portion 90 of the valve stem 62 to prevent product and/or propellant from freely flowing from the container and through the orifice. The portion of the valve seal 82 positioned between the orifice and the third portion prevents product and/or propellant from flowing to the orifice prior to the valve stem being moved to a dispensing configuration. When the valve stem is in a sealing configuration, the valve seal 82 prevents product and/or propellant from accessing the orifice and contains the product and/or propellant within the container. A second portion of the valve seal 82 may be located between the orifice and the first portion 86 of the valve stem to prevent product and/or propellant from freely flowing through the inner passageway 74 and out the first passageway opening 76 as product and/or propellant flow through the orifice.

The valve stem 62 may include a third portion 90, opposite the first portion 86. The third portion 90 of the valve stem 62 may include a retaining member 110. The retaining member 110 may be joined to the third portion 90 of the valve stem 62 or the retaining member 110 may be formed with the remainder of the valve stem 62. The retaining member 110 may be formed from the same material as the other portions of the valve stem 62 or with a different material. For example, the retaining member 110 may be formed, at least in part, with a first material and the remainder of the valve stem 62 may be formed with one or more other materials that are different from the first material. The first material may have a melting point or a glass transition temperature (tg) that is lower than the one or more other materials to allow at least the portion of the retaining member including the first material to melt, soften, deflect, or deform at a given temperature that is relatively lower than the remainder of the valve stem 62.

At least a portion of the retaining member 110 may extend outward, such as radially outward, beyond the outer stem surface 92 and may be configured to engage a portion of the valve body 54 and/or the valve seal 82. The retaining member may be axisymmetric or non-axisymmetric. The retaining member 110 may work in cooperation with the resilient member 58 to position the valve stem 62 in a sealing configuration. The retaining member 110 may be any shape such that a portion of the retaining member 110 may operatively engage at least one of a portion of the valve body 54 and the valve seal 82. The shape of the retaining member 110 may be such that the retaining member 110 maintains the position of the valve stem 62 during safe operating conditions and aids in safely moving the valve stem to vent the container during adverse operating conditions, such as relatively elevated temperatures and/or over pressurization of the aerosol dispenser.

The product delivery device 56 may be positioned between the valve assembly 52 and the container 32. The product delivery device 56 and the valve assembly 52 may be disposed, at least in part, in the neck of the container 32. For example, such as illustrated in FIGS. 4A and 4B, the dip tube and the dip tube adapter 64 may be disposed in the container such that the dip tube 26 extends into the container and the dip tube adaptor 64 is joined to the neck 40 of the container 32. The valve assembly 52 may be disposed on a portion of the dip tube adaptor and a portion of the neck 40. The dip tube adaptor and the valve assembly are in fluid communication. Similarly, the bag 24 may be disposed in the container such that a portion of the bag 24 is joined to the neck 40 of the container 32 and a portion of the bag 24 extends into the container 32. The valve assembly 52 may be disposed on a portion of the bag 24 and a portion of the neck 40. The bag and the valve assembly are in fluid communication.

Referring to FIGS. 5A-5D, the valve assembly 52 may include a valve body 54. The valve body 54 includes an outer surface 72 and an inner passageway 74 extending about a longitudinal axis 70. As previously discussed, the inner passageway 74 includes a first passageway opening 76, a second passageway opening 78, and a passageway surface 80 extending from the first passageway opening 76 to the second passageway opening 78. The valve body 54 may include a first valve body surface 96 and a second valve body surface 98 opposite the first valve body surface 96. The valve body surfaces may extend from the outer surface 72 of the valve body to the inner passageway 74. The valve body surfaces may have any geometry such that the valve body may be joined to the container and an adequate seal may be maintained. As illustrated in FIG. 5A-5D, the surface may include a step portion, also referred to herein as a transition portion, such that the first surface is not continuously planar from the outer surface to the inner passageway.

Figure 5A:
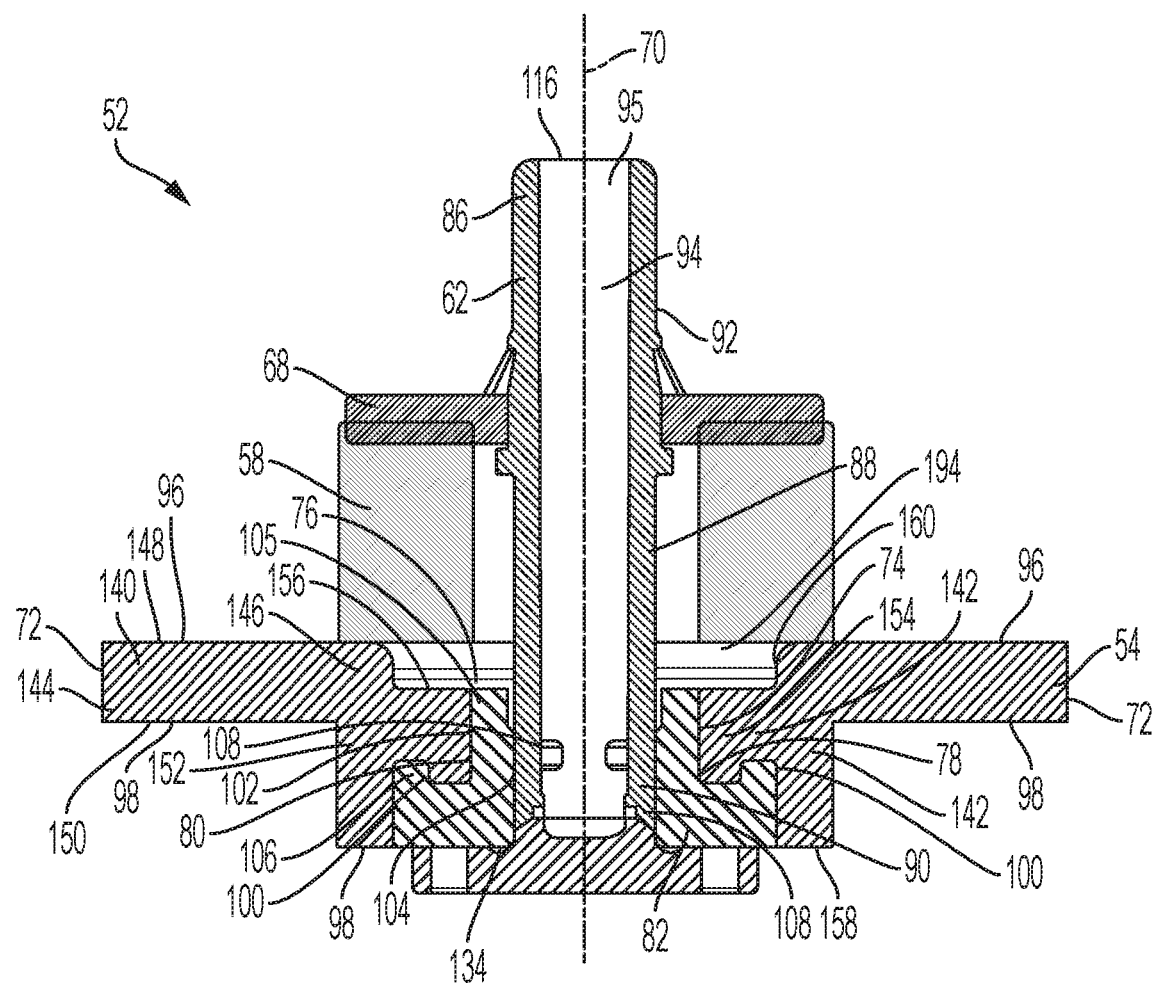
FIG. 5A is a sectional view of a valve assembly.

With reference to FIG. 5A, the valve body 54 may include a first hoop member 140 and a second hoop member 142. The first hoop member may extend about the longitudinal axis. The first hoop member may include a first hoop outer portion 144 positioned adjacent the inner neck portion, a first hoop inner portion 146 opposite to the first hoop outer portion 144, a first hoop upper surface 148, and a first hoop lower surface 150 opposite to the first hoop upper surface. The valve body 54 may include a second hoop member 142 including a second hoop outer portion 152, a second hoop inner portion 154, a second hoop upper surface 156, and a second hoop lower surface 158. The second hoop inner portion 154 extends about the longitudinal axis 70. A portion of the second hoop member 142 defines the inner passageway 74.

The first hoop member 140 may be joined to the second hoop member 142. A portion of the second hoop upper surface 156 may be joined to a portion of the first hoop lower surface 150. The first hoop member 140 may be joined to the second hoop member 142 such that a transition portion 160, also referred to herein as a step portion, is formed between the first hoop member and the second hoop member. The transition portion 160 may be positioned between the first hoop upper surface and the second hoop upper surface.

Figure 5B:
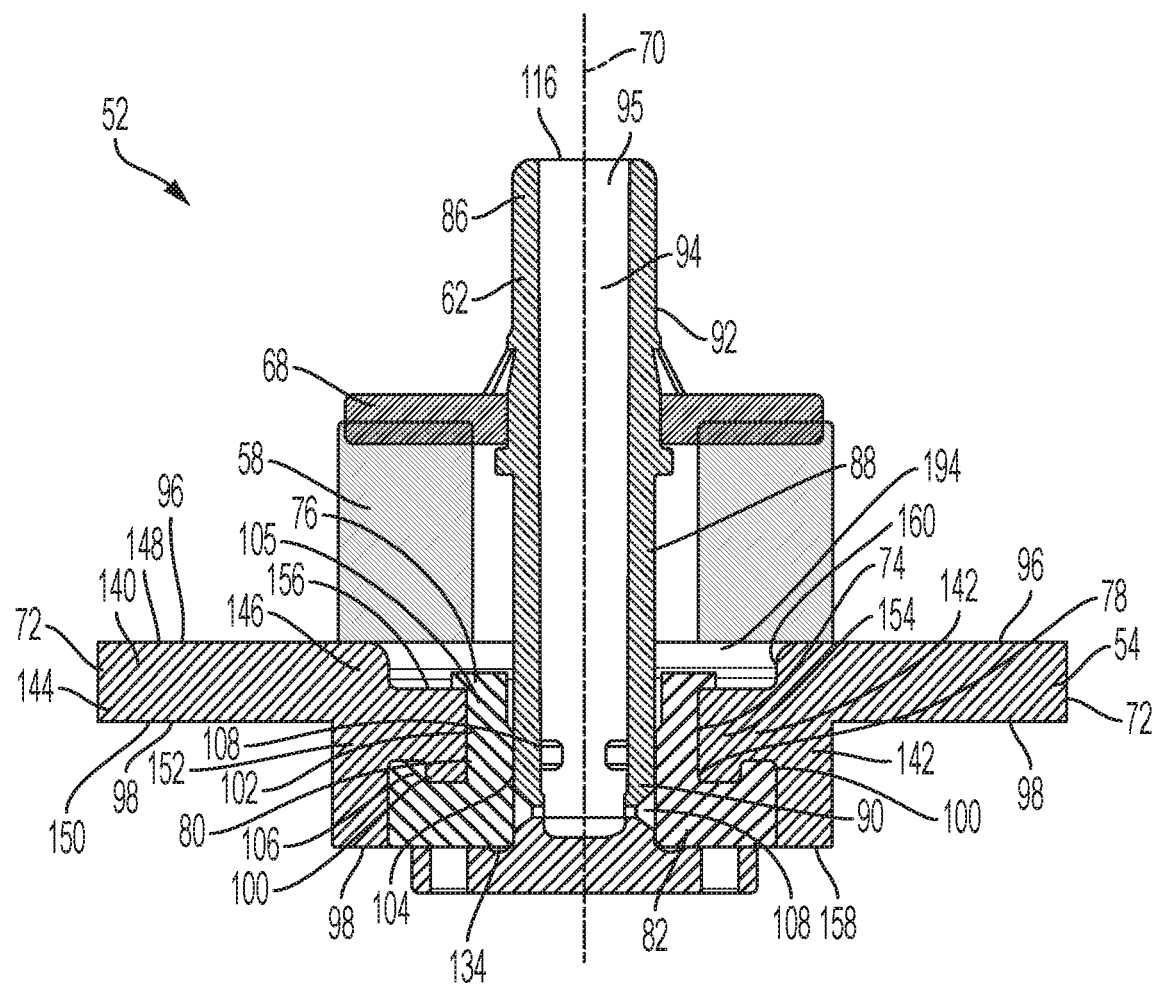
FIG. 5B is a sectional view of a valve assembly.

The valve body 54 may include a valve body cavity 100, such as illustrated in FIGS. 5A and 5B. The valve body cavity 100 is a cavity defined by a portion of the valve body 54 and may be positioned between the inner passageway 80 and the outer surface 72. The valve body cavity 100 may be positioned adjacent to the inner passageway 80 so that a portion of the valve seal 82 may extend from the inner passageway 80 and into the valve body cavity 100. The valve body cavity 100 may extend, either partially or wholly, about the longitudinal axis 70. The valve body cavity 100 may extend from the second valve body surface 98 towards the first valve body surface 96. The valve body cavity 100 may extend from the inner passageway 80 toward the outer surface 72 of the valve body 54. The valve body cavity 100 may be any shape such that a portion of the valve seal may be disposed within at least a portion of the valve body cavity 100.

The second hoop member 142 may include the valve body cavity 100, such as illustrated in FIG. 5A. The valve body cavity may extend from a portion of the second hoop lower surface 158 toward the second hoop upper surface 148. It is to be appreciated that the valve body cavity 100 may extend in a direction substantially perpendicular to a portion of the second hoop lower surface 158 or at an angle to the second hoop lower surface 158. The valve body cavity 100 may extend through the second hoop member and into a portion of the first hoop member.

It is also to be appreciated that the first hoop member 140 may include the valve body cavity 100 or a portion thereof.

The valve body cavity 100 may be configured to accept a portion of the valve seal 82. More specifically, a portion of the valve seal 82 may extend from the inner passageway 80 about the second passageway opening 78 and into at least a portion of the valve body cavity 100. The valve seal 82 includes a valve seal first end portion 105 and a valve seal second end portion 106. The valve seal first end portion 105 may be disposed within the inner passageway 80. The valve seal second end portion 106 may be opposite the valve seal first end portion 105. At least a portion of the valve seal second end portion 106 may be disposed within the valve body cavity 100. At least a portion of the valve seal second end portion 106 may be substantially surrounded by the valve body cavity 100. The valve body cavity 100 protects the valve seal second end portion 106 from separating from the valve body 54 under intended operating conditions. The valve body cavity 100 prevents propellant and/or product from coming into contact with the valve seal second end portion 106 and thereby separating the valve seal from the valve body and allowing product and/or propellant to be released from the container unintentionally.

As previously discussed, the valve assembly 52 may include a valve seal 82. The valve seal 82 may be molded into position and attached, such as through the adhesive-like properties of the material of the valve seal 82, to at least a portion of the passageway surface 80, or the valve seal 82 may be separately manufactured and subsequently inserted such that it is joined to at least a portion of the passageway surface 80 and/or about the second passageway opening 78. The separately manufactured valve seal 82 may be joined to a portion of the valve body 54. The valve seal 82 may be joined to the passageway surface 80. The valve seal 82 may be made from any material that provides a seal between the valve seal 82 and the valve stem 62. The valve seal 82 may be made from one or more materials including thermoplastic elastomers (TPE), silicone, rubber, or polymers, which may be foamed. For increased sustainability, the valve seal 82 may be made from a material such that when the aerosol dispenser is processed for recycling, the valve seal 82 separates from the passageway surface 80.

The valve seal 82 includes a first seal surface 102 and a second seal surface 104, which is opposite the first seal surface 102. The first seal surface 102 abuts at least one of a portion of the passageway surface 80 and the second passageway opening 78. The first seal surface 102 may be joined to at least one of a portion of the passageway surface 80 and the second passageway opening 78. At least a portion of the second seal surface may be in facing relationship with the valve stem 62 and a portion of the second seal surface 104 may operatively engage a portion of the valve stem 62 to form a seal therewith. The valve stem 62 extends through the inner passageway 80 and includes an outer stem surface 92 and an inner stem surface 94. A portion of the second seal surface 104 operatively engages a portion of the outer stem surface 94. The valve stem 62 includes one or more orifices 108 that extend from the outer stem surface 94 to the inner stem surface 94 and are in fluid communication with the channel 95. The one or more orifices allow product and/or propellant to be dispensed from, or filled into, the container. These orifices 108 need to remain sealed when the valve stem 62 is in a sealing configuration. The valve seal 82 operatively engages the valve stem 62 to form a seal that prevents propellant and/or product from accessing the orifice when the valve stem 62 is in a sealing configuration. The valve seal 82 is configured to remain in a stationary position as the valve stem is moved from the sealing configuration to the dispensing configuration and from the dispensing configuration to a filling configuration. The movement of the valve stem with respect to the valve seal allows controlled dispensing and/or filling of product and/or propellant through the one or more orifices of the valve stem.

The valve seal 82 may be shaped such that a portion of the valve seal 82 engages the outer surface of the valve stem between the orifice and the interior of the container, which prevents propellant and/or product from accessing the orifice in the sealing configuration. The valve seal 82 may also be shaped such that a portion of the valve seal 82 engages the outer surface of the valve stem between the orifice and the first passageway opening 76 such that product and/or propellent flow through the orifice but do not flow through the first passageway opening 76 and into unintended portions of the valve assembly when the valve stem is in a dispensing configuration. Further, it is to be appreciated that the valve seal may be shaped, such as by varying the thickness, so that one or more gaps are present between the second seal surface 104 and the outer surface of the valve stem. The gaps allow for one way to control the amount of fiction between the valve seal and the valve stem. By reducing the contact area between the second surface of the valve seal and the outer surface of the valve stem, friction may also be reduced. It is to be appreciated that reducing contact area is one way to control friction, but friction may also be controlled by other means, such as material selection and the use of lubricants.

The various shapes of the valve seal may also aid in safely venting product and/or propellant at relatively elevated temperatures and pressures. For example, during a situation where the dispenser experiences relatively high temperatures such that propellant and/or product needs to be safely vented, the valve seal may separate from the valve stem to allow controlled release of product and/or propellant. The time and extent to which the valve stem and the valve seal separate may be changed based on the shape and material properties of the valve seal. The valve seal may have various thicknesses such that portions of the valve seal do not contact the valve stem, forming a gap, and other portions of the valve seal may have varying amounts of contact with the valve stem such that certain portions will separate more easily from the valve stem.

As illustrated in FIG. 5A, the valve seal 82 is positioned between the valve body 54 and the valve stem 62. The valve seal 82 includes a first seal surface 102 that abuts a portion of the valve body 54 and a second seal surface 104 in facing relationship with at least a portion of the valve stem 62. The valve seal 82 extends from the first passageway opening 76 about the second passageway opening 78 and into the valve body cavity 100. More specifically, the first valve seal end portion 105 is disposed adjacent to the first passageway opening 76 and the second valve seal end portion 106 is substantially surrounded by the valve body cavity 100. The second seal surface 104 of the valve seal 82 operatively engages the outer surface of the valve stem such that the one or more orifices are sealed from the product and/or propellant when the valve stem is in a sealing configuration. The valve seal 82 may have a constant thickness from the valve seal first end portion 105 to the valve seal second end portion 106 or a varying thickness from the first valve seal end portion 105 to the second valve seal end portion 106.

As illustrated in FIG. 5B, the valve seal 82 is positioned between the valve body 54 and the valve stem 62. The first seal surface 102 abuts a portion of the valve body 54 and the second seal surface 104 is in facing relationship with at least a portion of the valve stem 62. The valve seal 82 has a variable thickness. The valve seal 82 extends about the first passageway opening 76 such that a portion of the valve seal first end portion 105 extends above the first passageway opening 76 and the valve seal second end portion 106 extends about the second passageway opening 78 and at least a portion is disposed in the valve body cavity 100. The portion of the valve seal first end portion 105 that extends about the first passageway opening 76 may aid in maintaining the position of the valve seal 82 to the valve body 54. The portion of the valve seal first end portion 105 that extends above the first passageway opening 76 may be configured to operatively engage a portion of the resilient member 58.

Figure 5C:
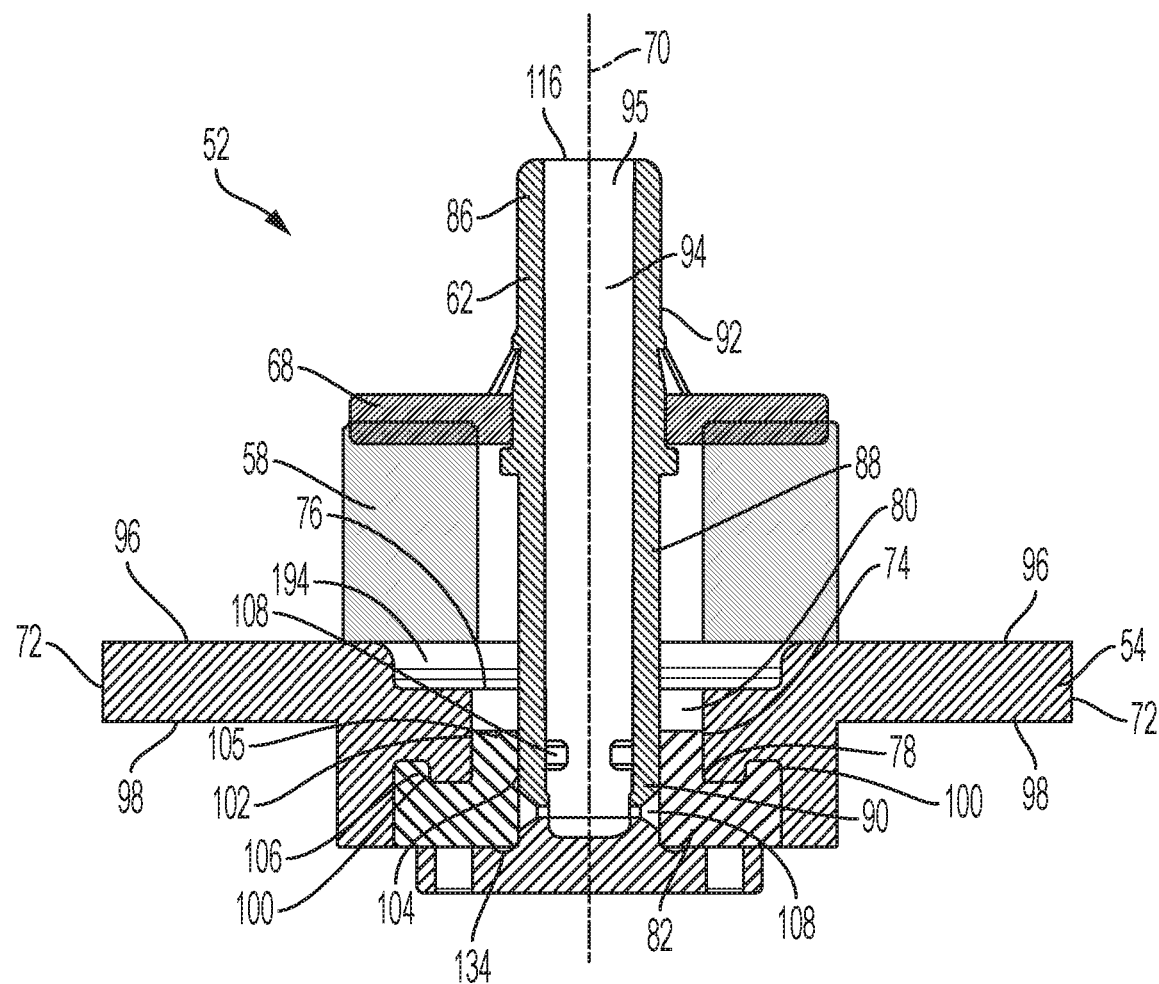
FIG. 5C is a sectional view of a valve assembly.

As illustrated in FIG. 5C, the valve seal 82 is positioned between the valve body 54 and the valve stem 62. The first seal surface 102 abuts a portion of the valve body 54 and the second seal surface 104 is in facing relationship with at least a portion of the valve stem 62. The valve seal 82 may have a variable or constant thickness. The valve seal first end portion 105 may be disposed between the first passageway opening 76 and the second passageway opening 78. A gap may be present between the first passageway opening 76 and the valve seal first end portion 105. By having the valve seal first end portion 105 extend through only a portion of the first passageway surface, the contact friction between the valve seal and the valve stem is reduced. The reduced friction may allow for reducing the amount of force needed to move the valve stem from a sealing configuration to a dispensing configuration. The valve seal second end portion 106 extends about the second passageway opening 78 and at least a portion may be disposed in the valve body cavity 100.

Figure 5D:
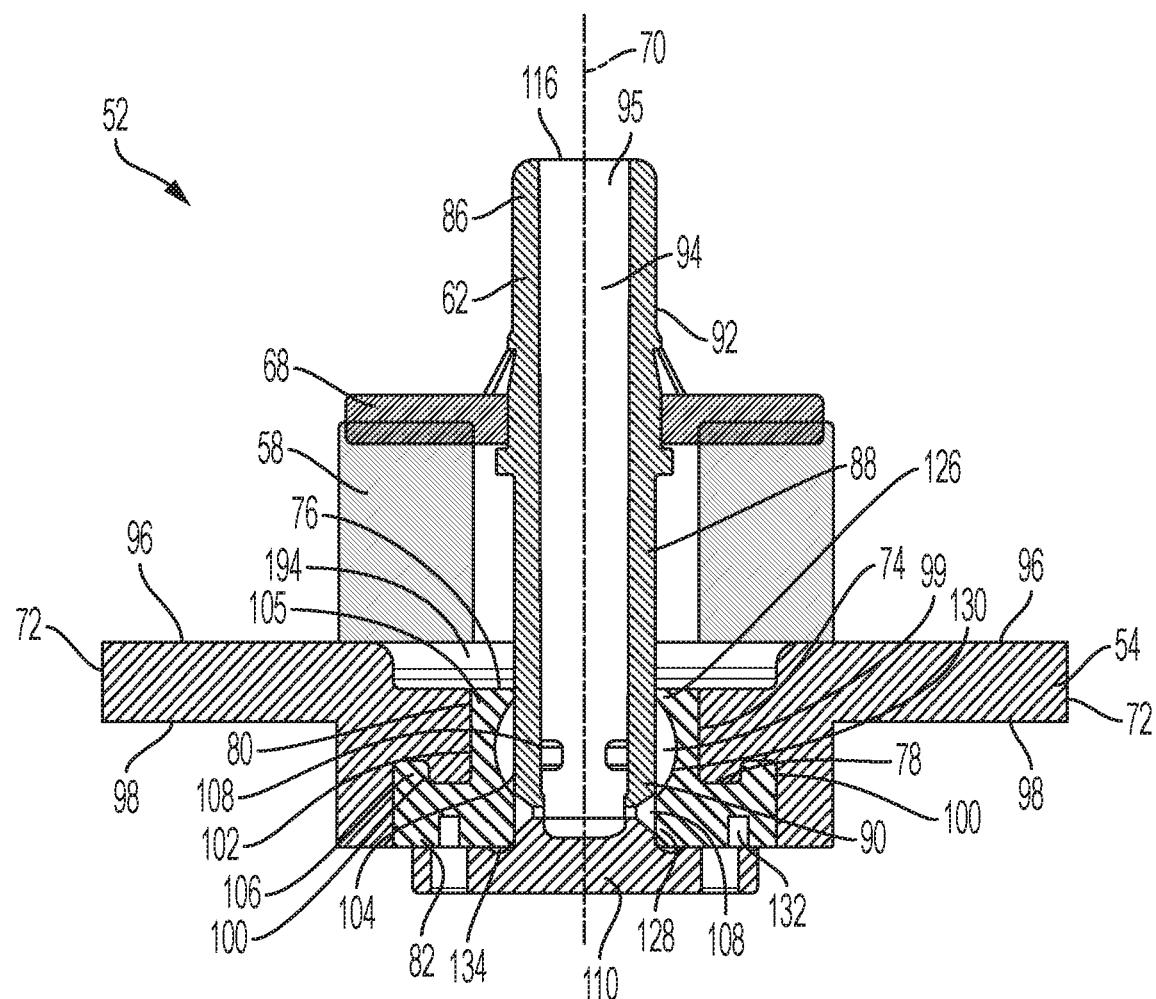
FIG. 5D is a sectional view of a valve assembly.

As illustrated in FIG. 5D, the valve seal 82 is positioned between the valve body 54 and the valve stem 62. The first seal surface 102 abuts a portion of the valve body 54 and the second seal surface 104 is in facing relationship with at least a portion of the valve stem 62. The valve seal 82 may extend from the first passageway opening 76 or from some portion of the inner passageway 74 and the valve seal second end portion 106 extends about the second passageway opening 78 and at least a portion is disposed in the valve body cavity 100. The valve seal 82 has a variable thickness. The valve seal 82 may have variable thickness within a portion of the valve seal. For instance, the valve seal first end portion 105 may have an upper portion having a first thickness and a lower portion having a second thickness. The first thickness may be greater than or less than the second thickness. Similarly, any portion of the valve seal may have varying thickness. The change in thickness may result in one or more valve gaps 99 formed between the valve seal 82 and the valve stem 62. As previously discussed, the change in thickness of the valve seal, may allow for greater control of the force required to move the valve stem by reducing the amount of friction between the valve seal and valve stem. The change in thickness may also save on material cost by reducing the amount of material needed to form an adequate seal.

As illustrated in FIG. 5D, the presence of one or more valve gaps 99 results in only portions of the second seal surface 102 being operatively engaged with the valve stem 62. The valve seal 82 may include a first engagement portion 126, a second engagement portion 128, and a nonengagement portion 130. The nonengagement portion 130 may be positioned between the first engagement portion 126 and the second engagement portion 128. The first engagement portion 126 may be configured to operatively engage a portion of the outer surface of the valve stem. The first engagement portion 126 may be positioned between the first portion 86 of the valve stem 62 and the one or more orifices 108. The first engagement portion 126 may be positioned between the first passageway opening 76 and the one or more orifices 108. The first engagement portion 126 may be configured to form a seal with the outer surface of the valve stem and prevent propellant and/or product from flowing into unintended areas of the valve assembly 52. The second engagement portion 128 may be positioned adjacent to the third portion 90 of the valve stem 62. The second engagement portion 128 may be positioned between the retaining member 110 and the one or more orifices 108. The second engagement portion 128 may be positioned adjacent to the one or more orifices 108. The second engagement portion 128 may be configured to prevent product and/or propellant disposed in the container from accessing the one or more orifices while the valve stem is in a sealing configuration. The one or more orifices 108 may be positioned between a first engagement portion 126 and a second engagement portion 128 to control dispensing of the product and/or propellant. The nonengagement portion 130 of the valve seal does not contact the outer surface of the valve stem and/or does not engage the outer surface as to form a seal with the valve stem. A valve gap 99 may be formed between the nonengagement portion 130 and the outer surface of the valve stem. It is to be appreciated that the valve seal may be shaped and, thus, have various thicknesses that results in one or more engagement portions and one or more nonengagement portions.

As illustrated in FIG. 5D, the valve seal 82 may include one or more valve seal voids 132. The void may be any one or a slit, slot, notch, which includes concavities. The valve void 132 may extend from the second seal surface 104 and extend in a direction toward the first seal surface 102. The valve seal void 132 may aid in movement of the valve seal 82 to allow for safe venting of product and/or propellant when the dispenser is subject to relatively high temperatures. The valve seal void 132 may allow the valve seal to separate from the valve stem more easily to allow for safe venting. The valve seal void 132 may be any shape or size that allows for a seal to be maintained under normal use conditions and for the seal to be broken and to safely vent product and/or propellant under excessive use conditions, such as relatively high temperatures. The valve seal voids may allow the valve stem to move more easily and thus reduce the force needed to move the valve stem.

The valve seal 82 may include a seal protrusion 134. The seal protrusion 134 extends from the second seal surface 104 towards the bottom of the container. The seal protrusion 143 may be any shape such that when the retaining member 110 engages the valve seal 82 a greater force is concentrated at the area of contact between the seal protrusion 134 and the retaining member 110. It is to be appreciated that a portion of the valve stem 62 may also or alternatively engage the seal protrusion 134. The seal protrusion 134 aids in forming a relatively stronger seal between the valve seal 82 and the retaining member 110 and/or the valve stem 62.

As illustrated in FIGS. 6A and 6B, the valve body 54 may include one or more members that extend from at least one of the first valve body surface 96 and the second valve body surface 98. The valve body 54 may include a first brace member 162. The first brace member 162 may be joined to the first valve body surface 96 and extend away from the first valve body surface 96. The first brace member 162 may extend continuously or discontinuously about the inner passageway 74. The first brace member 162 may be positioned adjacent to the outer surface 72 of the valve body 54. The first brace member 162 may be positioned between the outer surface 72 and the inner passageway 74 of the valve body 54. The first brace member 162 may extend in a direction away from the first valve body surface 96. The first brace member 162 may extend such that the outer most portion of the first brace member 162 extends above at least a portion of the resilient member 58. The first brace member 162 has a first brace member height H1 measured from the first valve body surface 96 to the outer most portion of the first brace member 162. The first brace member height H1 may be less than about 25 mm. The first brace member height H1 may be from about 0.1 mm to about 25 mm, or from about 1 mm to about 20 mm, or from about 5 mm to about 15 mm, or from about 5 mm to about 10 mm. The first brace member 162 may be used to protect at least a portion of the valve stem 62. The first brace member height H1 may be such that the first brace member 162 extends above or is at the same height as the top of the valve stem. The first brace member 162 may provide stability to the valve body 54 when subject to overpressurization and/or relatively high temperatures. An actuator or other dispensing component may be joined to a portion of the first brace member 162.

The valve body 54 may include a second brace member 164. The second brace member 164 may be joined to the first valve body surface 96 and extend away from the first valve body surface 96. The second brace member 164 may be positioned between the outer surface 72 and the inner passageway 74 of the valve body 54. The second brace member 164 may extend continuously or discontinuously about the inner passageway 74. The second brace member 164 may be positioned between the first brace member 162 and the inner passageway 74 of the valve body 54. The second brace member 164 may extend in a direction away from the first valve body surface 96 such that the outer most portion of the second brace member 164 extends above a portion of the resilient member 58. The second brace member 164 has a second brace member height H2 measured from the first valve body surface 96 to the outer most portion of the second brace member 164. The second brace member height H2 may be less than about 25 mm. The second brace member height H2 may be from about 0.1 mm to about 25 mm, or from about 1 mm to about 20 mm, or from about 5 mm to about 15 mm, or from about 5 mm to about 10 mm. The second brace member height H2 may be greater than, less than, or equal to the first brace member height H1. The second brace member 164 may be used to protect at least a portion of the valve stem 62. The second brace member height H2 may be such that the second brace member 164 extends above or is at the same height as the top of the valve stem. The second brace member 164 may provide stability to the valve body 54 when subject to overpressurization and/or relatively high temperatures. An actuator or other dispensing component may be joined to a portion of the second brace member 164.

The second brace member 164 may function to aid in guiding the engagement member 68 and/or the resilient member 58 as the valve stem 62 moves between the sealing configuration, the dispensing configuration, and the filling configuration. The second brace member 164 may substantially surround the engagement member 68 and/or the resilient member 58 such that the engagement member 68 may slidably move and the resilient member 58 may move, such as by deflecting or compressing. A gap may be present between the second brace member 164 and the engagement member 68. The engagement member 68 may slidably engage a portion of the brace member 164. For example, the engagement member may comprise a protrusion that slidably engages a ridge within the interior portion of the second brace member to prevent the engagement member from rotating.

The valve body 54 may include one or more ribs. A rib 166 may extend between the first brace member 162 and the second brace member 164. The rib 166 may be joined to at least one of the first brace member 162 and the second brace member 164. As illustrated in FIG. 6A, the rib may be joined to both of a portion of the first brace member 162 and a portion of the second brace member 164. The rib may extend radially between the first brace member 162 and the second brace member 164. The rib 166 may be joined to the first valve body surface 96. The rib 166 may not be joined to the first valve body surface 96 and, thus, a gap may be present between the first valve body surface 96 and the rib 166. The one or more ribs 166 may aid in manufacturing the aerosol dispenser. For example, the one or more ribs 166 may be used to grip the valve body 54 such that the valve body 54 may be moved and/or attached to the container. The one or more ribs 166 may be operatively engaged by processing equipment during the manufacture of the aerosol dispenser. The one or more ribs 166 may allow for welding, such as by spinning, the valve body 54 to the container. The one or more ribs 166 may also provide structural stability to the valve body 54. The one or more ribs 166 may aid in controlling the deformation of the valve body 54 when the aerosol dispenser is subject to relatively high temperatures, for example.

As previously discussed, the valve body 54 may include a first hoop member 140. Each of the first brace member 162, the second brace member 164, and the rib 166 may extend from the first hoop member 140. Each of the first brace member 162, the second brace member 164, and the rib 166 may extend from of the first hoop upper surface 148. The first brace member 162 and the second brace member 164 may be joined to the first hoop upper surface 148. The rib 166 may be joined to the first hoop upper surface 148 or a gap may be formed between the first hoop upper surface 148 and the rib 166.

It is to be appreciated that the valve body 54 may include a single hoop member.

As illustrated in FIGS. 6A and 6B, the valve body 54 may include one or more protrusions that extend from at least one of the first valve body surface 96 and the second valve body surface 98. The valve body 54 may include a first attachment protrusion 168. The first attachment protrusion 168 may be joined to the second valve body surface 98 and extend away from the second valve body surface 98. The first attachment protrusion 168 may extend continuously or discontinuously about the inner passageway 74. The first attachment protrusion 168 may extend continuously or discontinuously about the longitudinal axis 70. The first attachment protrusion 168 may extend from the outer surface 72 of the valve body 54 towards the inner passageway 74. The first attachment protrusion may be positioned between the outer surface 72 and the inner passageway 74 of the valve body 54 or the longitudinal axis 70. The first attachment protrusion 168 has a first attachment protrusion height H3 measured from the second valve body surface 98 to the outer most portion of the first attachment protrusion 168. The first attachment protrusion height H3 may be from about 0.1 mm to about 10 mm, or from about 0.5 mm to about 8 mm, or from about 1 mm to about 6 mm, or from about 1 mm to about 3 mm. The first attachment protrusion 168 may include a width measured perpendicular to the longitudinal axis that may be less than the width of the first hoop member. The width of the first attachment protrusion 168 may be from about 0.5 mm to about 6 mm or from about 1 mm to about 4 mm or from about 1 mm to about 3 mm. The first attachment protrusion 168 may be configured to be join the valve body to a portion of the neck of the container. The first attachment protrusion 168 may be welded to a portion of the neck of the container. It is to be appreciated that first attachment protrusion may be joined to the neck such as by a press fit, interference fit, crimping, solvent welding, laser welding, sonic welding, ultrasonic welding, spin welding, adhesive, or any combination thereof. The height and width of the first attachment protrusion 168 may be selected to obtain a desired weld between the valve body and the container. Generally, the greater the surface area the greater the strength of the weld. The first attachment protrusion 168 may include one or more grooves or other surface profile such that gas may pass between a portion of the first attachment protrusion 168 and the neck prior to the valve body being sealed to the container.

As illustrated in FIGS. 6A and 6B, the valve body 54 may include a second attachment protrusion 170. The second attachment protrusion 170 may be joined to the second valve body surface 98 and extend away from the second valve body surface 98. The second attachment protrusion 170 may extend continuously or discontinuously about the inner passageway 74. The second attachment protrusion 170 may extend continuously or discontinuously about the longitudinal axis 70. The second attachment protrusion 170 may extend from the outer surface 72 of the valve body 54 towards the inner passageway 74. The second attachment protrusion 170 may be positioned between the outer surface 72 and the inner passageway 74 of the valve body 54 or the longitudinal axis 70. The second attachment protrusion 170 may be positioned between the first attachment protrusion 168 and the inner passageway 74 of the valve body 54 or the longitudinal axis 70. The second attachment protrusion 170 has a second attachment protrusion height H4 measured from the second valve body surface 98 to the outer most portion of the second attachment protrusion 170. The second attachment protrusion height H4 may be from about 0.1 mm to about 10 mm, or from about 0.5 mm to about 8 mm, or from about 1 mm to about 5 mm or from about 1 mm to about 3 mm. The second attachment protrusion height H4 may be greater than, less than, or equal to the first attachment protrusion height H3. The difference in height of the first attachment protrusion and the second attachment protrusion may allow for the valve body to be supported by the second attachment protrusion, which engages a portion of the neck of the container, while gas is passed between the neck of the container and the first attachment protrusion. The second attachment protrusion may form a temporary seal with a portion of the neck of the container or the product delivery device to control the flow of gas into the container. The second attachment protrusion width may be from about 0.1 mm to about 5 mm, or from about 0.5 mm to about 3 mm, or from about 1 mm to about 1.5 mm. The second attachment protrusion 170 may be configured to join the valve assembly to a portion of the neck of the container or a portion of the product delivery device 56. The second attachment protrusion 170 may be welded to a portion of the neck of the container or a portion of the product delivery device 56, such as a bag, dip tube, or dip tube adaptor. It is to be appreciated that second attachment protrusion may be joined to the neck such as by a press fit, interference fit, crimping, solvent welding, laser welding, sonic welding, ultrasonic welding, spin welding, adhesive, or any combination thereof.

The first attachment protrusion 168 and the second attachment protrusion 170 may be spaced from one another such that a gap is present between them. This gap may allow for control of material when the first attachment protrusion 168 and the second attachment protrusion 170 are joined to the neck of the container. For example, when the valve body 54 is welded, such as by spin welding, the material of the first attachment protrusion 168 and the second attachment protrusion becomes semi-fluid and may flow and generate flash. Flash is the excess material that flows outside of the region of the attachment area. Similarly, when the valve body is joined by an adhesive, the adhesive may overflow also generating flash. The gaps control the flow of flash. The flash moves into the gaps and prevent the flash from interfering with the valve body 54 and/or the container.

The valve body 54 may include a valve skirt 172. The valve skirt 172 may be joined to the second valve body surface 98 and extend away from the second valve body surface 98. The valve skirt 172 may extend continuously or discontinuously about the inner passageway 74. The valve skirt 172 may extend continuously or discontinuously about the longitudinal axis 70. The valve skirt 172 may be positioned between the outer surface 72 and the inner passageway 74 of the valve body 54 or the longitudinal axis 70. The valve skirt 172 may be positioned between the first attachment protrusion 168 and the inner passageway 74 of the valve body 54 or the longitudinal axis 70. The valve skirt 172 may be positioned between the second attachment protrusion 170 and the inner passageway 74 of the valve body 54 or the longitudinal axis 70. The valve skirt 172 may extend from at least one of the first hoop member 140 and the second hoop member 142. As illustrated in FIGS. 6A and 6B, the valve skirt 172 may extend from the second hoop lower surface 150 towards the bottom of the container. The valve skirt may be used to prevent material from interfering with the movement and operation of the valve assembly. The valve skirt may be used to prevent flash from mixing with the product and/or propellant. The valve skirt, for example, may prevent flash generated during the welding process from interfering with the movement and operation of the valve stem and the dispensing and/or filling of product and/or propellant. The valve skirt may control the flash such that the flash is contained in the area between the valve skirt and the outer surface of the valve body. It is to be appreciated that the valve skirt may or may not be present, and this may be dependent on the type and geometry of the product delivery device 56. The valve skirt 172 has a valve skirt height H5 measured from the second valve body surface 98 to the outer most portion of the valve skirt 172. The valve skirt height H5 may be from about 0.1 mm to about 15 mm, or from about 0.5 mm to about 10 mm, or from about 1 mm to about 5 mm, or from about 1 mm to about 3 mm. The valve skirt width may be from about 0.1 mm to about 1 mm or from about 0.3 mm to about 0.75 mm or from about 0.5 mm to about 0.6 mm. The valve skirt 172 may be configured to operatively engage a portion of the dip tube adaptor and/or bag.

As previously discussed, the valve stem 62 extends through the inner passageway 74 of the valve body 54. The valve stem 62 is positioned within the valve body 54 such that a portion of the valve stem 62 extends along the passageway surface 80 and adjacent to and/or through at least one of the first passageway opening 76 and the second passageway opening 78. The valve stem 62 includes an outer stem surface 92 and an inner stem surface 94. The inner stem surface 94 defines a channel 95 in fluid communication with a dispensing opening 116 through which product and/or propellant may be introduced into or dispensed from the container. The outer stem surface 92 may be configured to operatively engage at least one of the engagement member 68 and the resilient member 58 such that the resilient member 58 controls the movement of the valve stem 62. The engagement member 68 may include one or more protrusions to operatively engage a portion of the valve stem 62. The outer stem surface 92 may include one or more protrusions and/or notches to operatively engage the engagement member 68. The engagement member 68 may substantially surround the valve stem 62 and operatively engage the valve stem 62 such that moves with the valve stem 62.

Figure 7B:
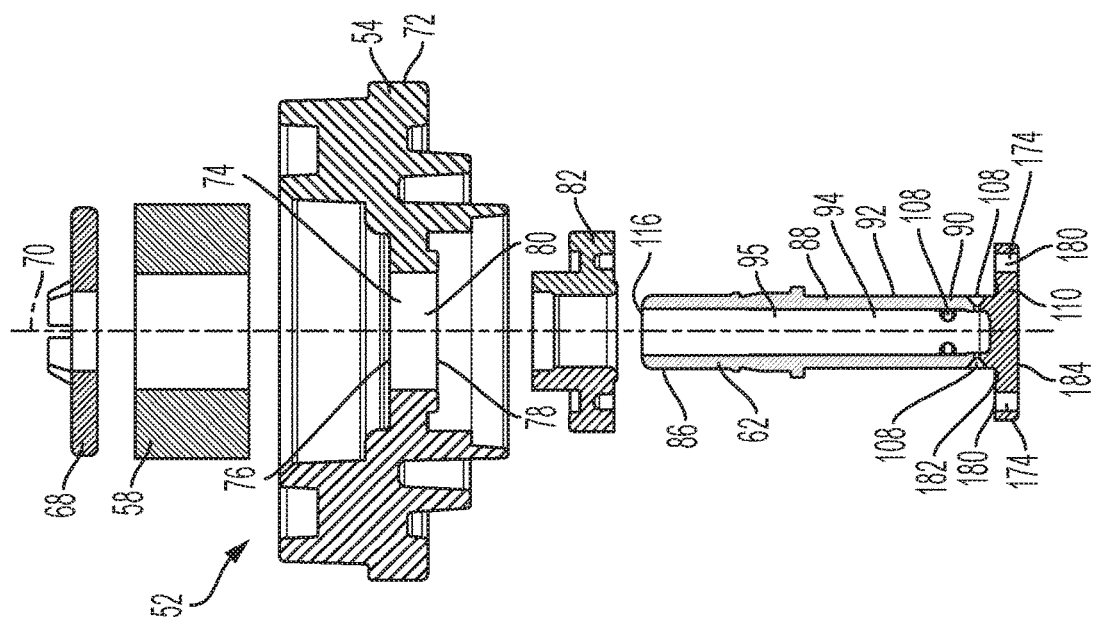
FIG. 7B is a side, exploded, sectional view of a valve assembly.

As illustrated in FIGS. 6B and 7B, the valve stem 62 may include a first stem portion 86, a second stem portion 88, and a third stem portion 90. The second stem portion 88 may be intermediate the first stem portion 86 and the third stem portion 90. The first stem portion 86 may be opposite the third stem portion 90. The retaining member 110 may be joined to a portion of the third stem portion 90. The retaining member 110 may extend outward from the outer stem surface 92. The retaining member 110 may be manufactured with the valve stem 62 such that it is a unitary member or the retaining member 110 may be attached to the valve stem 62. The valve stem 62 may be entirely constructed as a single piece or may be constructed from multiple parts; the multiple parts may or may not correspond to the first, second and third portions of the valve stem as delineated herein. The retaining member 110 extends outwardly from the longitudinal axis 70 to a distance that allows the retaining member 110 to form a seal with the valve seal 82. The retaining member 110 engages a portion of the valve seal 82 when the valve stem 62 is in a sealing configuration to prevent propellant and/or product from being released through the valve stem 62. The retaining member 110 may be any shape that allows the retaining member to form a seal with a portion of the valve seal. For example, the retaining member 110 may be substantially circular, rectangular, square, or an irregular shape. The retaining member 110 may be axisymmetric or non-axisymmetric.

The retaining member 110 may be used to form a seal with the valve seal and to prevent the valve stem 62 from being unsafely disjoined from the aerosol container. For example, if the aerosol container is subject to relatively high temperatures, the pressure of the aerosol may become relatively high resulting in a need to safely relieve some or all of the pressure. The retaining member may be shaped such that as the aerosol container is subject to relatively high temperatures, the seal between the retaining member and the valve seal is broken and product and/or propellant may be released while the valve stem is held within the container by the retaining member 110.

The retaining member 110 may be a substantially solid and substantially uniform member, such as illustrated in FIG. 6B. The retaining member 110 may include a first retaining member surface 182 and a second retaining member surface 184. The first retaining member surface 182 may have a substantially planar surface or a non-planar surface. The second retaining member surface 184 may have a substantially planar surface or a non-planar surface. Each of the first retaining member surface 182 and the second retaining member surface 184 may be shaped so as to affect the operative engagement of the valve seal 82 and/or the valve body 54. For example, the first retaining member surface 184 may be shaped such that the pressure between the first retaining member surface 184 and the valve seal 82 is concentrated over one or more desired areas.

Figure 7A:
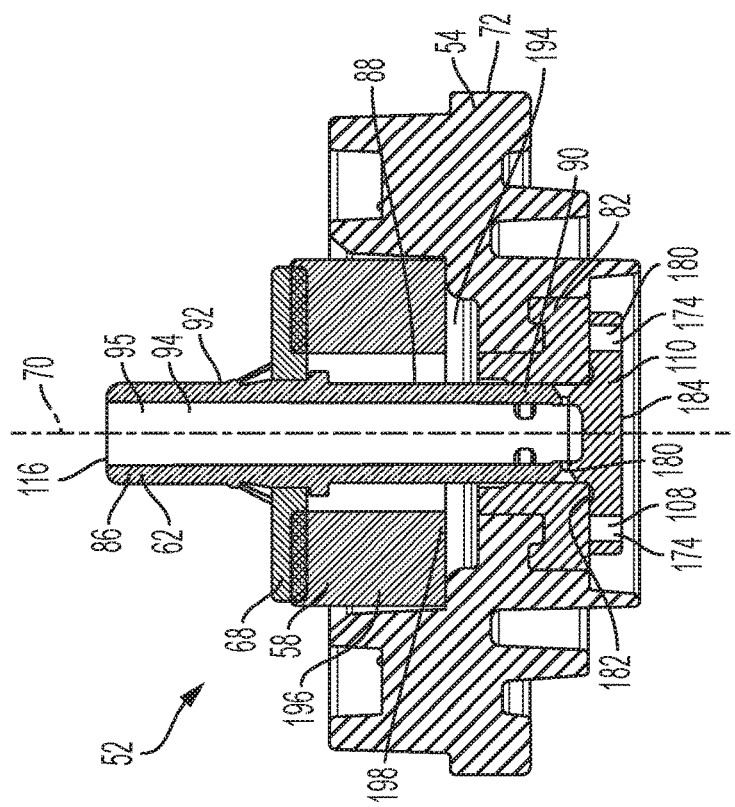
FIG. 7A is a perspective, sectional view of a valve assembly.
Figure 8A:
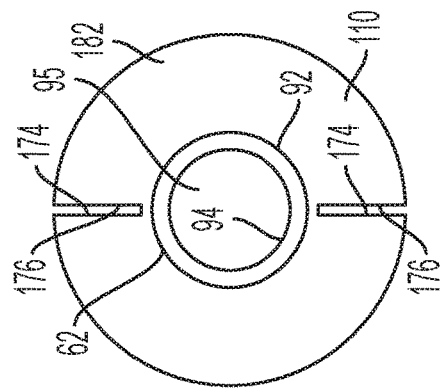
FIG. 8A is a top view of a valve stem including a retaining member having an aperture.

The retaining member 110 may including one or more voids 174, such as illustrated in FIGS. 7A, 7B, 8A-8C, 9A, 9B, 10A, and 10B. The one or more voids 174 may allow for control of the flow of propellant/product and for controlled deformation of the retaining member 110 when the aerosol dispenser is subject to relatively high temperatures. For example, when the retaining member, or any portion of the aerosol dispenser, is in a deformed state, product and/or propellant may escape from the container through the voids 174 while the valve stem 62 is retained essentially in place by the retaining member. The one or more voids 174 may include at least one of a slot 176, a notch 178, and an aperture 180. As illustrated in FIGS. 7A, 7B, and 8A, the retaining member 110 includes one or more apertures 180. The one or more apertures 180 extend from a first retaining member surface 182 to a second retaining member surface 184. The one or more apertures 180 allow for propellant and/or product to flow therethrough. The one or more apertures 180 may be any shape such that propellant and/or product may pass through the aperture. For example, the one or more apertures may be substantially circular, ellipse, rectangular, square, hexagonal, triangular, or some irregular shape.

Figure 8B:
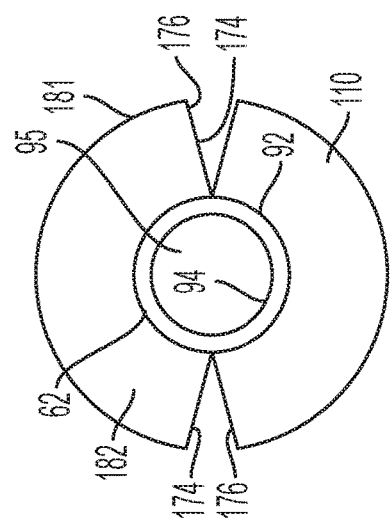
FIG. 8B is a top view of a valve stem including a retaining member having a slot.
Figure 8C:
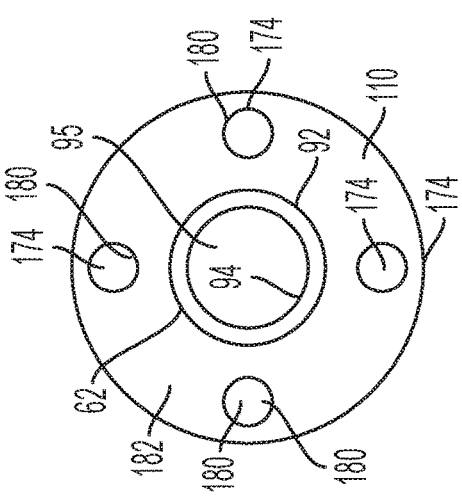
FIG. 8C is a top view of a valve stem including a retaining member having a slot.
Figure 9A:
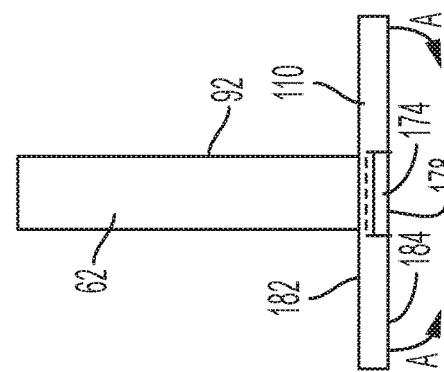
FIG. 9A is a side view of a valve stem including a retaining member having a notch.
Figure 9B:
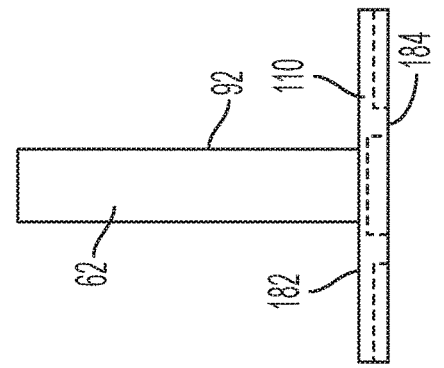
FIG. 9B is a side view of a valve stem including a retaining member having a notch.

As illustrated in FIGS. 8B and 8C, the retaining member 110 may include one or more slots 176 that extend from a retaining member perimeter 181 toward the valve stem 62. The one or more slots 176 may be any shape such that propellant and/or product may pass through the aperture. For example, the one or more apertures may be substantially circular, ellipse, rectangular, square, hexagonal, triangular, or some irregular shape.

Figure 10A:
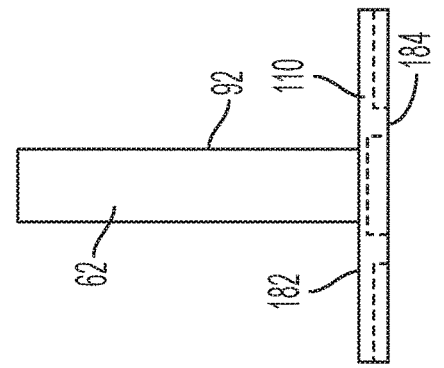
FIG. 10A is a side view of a valve stem including a retaining member having a notch.
Figure 10B:
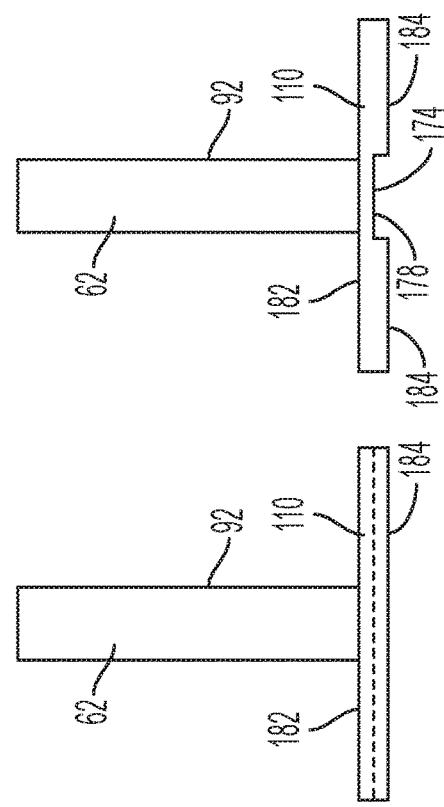
FIG. 10B is a side view of a valve stem including a retaining member having a notch.

As illustrated in FIGS. 9A, 9B, 10A, and 10B, the retaining member 110 may include one or more notches 178. Each of the one or more notches 178 may extend from the first retaining member surface 182 towards the second retaining member surface 184 or from the second retaining member surface 184 towards the first retaining member surface 182. The one or more notches 178 may extend from a retaining member perimeter 181 toward the valve stem 62. The one or more notches 178 may be located within the retaining member perimeter 181. The one or more notches 178 may be any shape such that the one or more notches allow for the deformation of the retaining member to be controlled and/or prevent the valve stem from being expelled from the valve body at elevated temperatures and pressures. For example, the one or more notches may be substantially circular, ellipse, rectangular, square, hexagonal, triangular, or some irregular shape. As previously stated, the one or more notches 178 may aid in controlling the deformation of the retaining member 110. FIG. 10B illustrates an example of a notch 178 extending along the second retaining member surface 184 and the deformation direction, indicated by arrow A, of a portion of the retaining member 110. The retaining member 110 may deform such that the retaining member 110 separates from the valve seal by moving in a direction, arrow A, towards the bottom of the container. The separation and movement of the bottom retaining member 110 allows for product and/or propellant to be released from the container and for the valve stem to be retained within the valve body.

The valve assembly 52 may include a resilient member 58. The resilient member 58 may be disposed on at least a portion of the valve body 54. The resilient member 58 may be disposed on at least a portion of the first valve body surface 96, such as illustrated in FIGS. 5A-5D, 6A, 7A, 11, and 12. The resilient member 58 may include a first resilient member surface 190 and a second resilient member surface 192. The resilient member 58 may be positioned between the engagement member 68 and the first valve body surface 96. The second engagement member surface 188 may operatively engage at least a portion of the first resilient member surface 190 and the second resilient member surface 192 may be disposed on at least a portion of the first valve body surface 96. The second engagement member surface 188 may extend over the first resilient member surface 190 such that the engagement member 68 compresses the resilient member 58 as the valve stem 62 moves between the sealing, dispensing, and/or filling configurations.

The resilient member 58 may be disposed within the valve body 54 such that the resilient member does not extend beyond the valve body 54. The resilient member 58 may be disposed within the valve body 54 such that a portion of the resilient member 58 extends above the valve body 54, such as illustrated in FIG. 11. The extension of the resilient member 58 may be based on the height of the resilient member. The resilient member 58 may have a resilient member height RH. The resilient member height RH may be from about 3 mm to about 15 mm, or from about 4 mm to about 8 mm, or from about 5 mm to about 7 mm, or about 6 mm. The resilient member height RH is measured parallel to the longitudinal axis 70. The resilient member height RH may be greater than or less than the dispensing distance DD, which is the distance the valve stem 62 moves in the direction toward the bottom of the container from the sealing configuration to the dispensing configuration. The dispensing distance DD is the distance the valve stem 62 travels to allow product and/or propellant to enter the orifice 108. As illustrated in FIG. 11, the dispensing distance DD is the distance measured parallel to the longitudinal axis 70 from the orifice 108 to the first retaining member surface 182. The dispensing distance may be less than about 50% of the resilient member height RH, or less than about 30% of the resilient member height RH, or less than about 25% of the resilient member height.

It is to be appreciated that for those aerosol dispensers that have an orifice for dispensing and an orifice for filling, the resilient member height RH may need to account for this additional filling orifice. Thus, the resilient member height RH is greater than the filling distance FD, which is the distance the valve stem 62 moves in direction toward the bottom of the container from the sealing configuration to the filling configuration. The filling distance FD is the distance the valve stem 62 travels to allows product and/or propellant to enter the orifice 108 that is used for filling the container. As illustrated in FIG. 11, the filling distance FD is the distance measured parallel to the longitudinal axis 70 from the orifice 108 to the first retaining member surface 182. The filling distance may be greater than about 50% of the resilient member height RH or greater than about 70% of the resilient member height RH.

The resilient member 58 may also be placed under a preload such that the valve stem 62 has a certain amount for force biasing the valve stem 62 in a direction toward the valve body to aid in maintaining a seal between the valve seal 82 and the valve stem 62. Thus, the resilient member height RH may also account for the preload of the valve stem 62. Further, the material properties of the resilient member 58 may require additional height be added to the resilient member 58 to attain a consumer acceptable return of the valve stem from the dispensing configuration to the sealing configuration and to prevent the consumer from moving the valve stem 62 to the filling configuration, which may result in an unacceptable amount of product being dispensed from the aerosol dispenser.

The resilient member 58 may have an unloaded resilient member height, which is the height of the resilient member measured from the first resilient member surface to the second resilient member surface without any force acting on the resilient member. The resilient member 58 may have a preload resilient member thickness, which is the height of the resilient member measured from the first resilient member surface to the second resilient member surface with a preload force. The preload force may be supplied by the engagement member. The unloaded resilient member height is greater than or equal to the preload resilient member height. The resilient member 58 may have a loaded resilient member height, which is the height of the resilient member measured from the first resilient member surface to the second resilient member surface with a loading force greater than the preload force applied to the resilient member. The loading force may be supplied by a user. The loaded resilient member height is less than the unloaded resilient member height and the preloaded resilient member height. It is to be appreciated that the resilient member may include one or more portions and each of the one or more portions may have different or the same unloaded heights, preloaded heights, and loaded heights.

It is to be appreciated that if the resilient member is relatively thin, portions of the resilient member may be strained as the valve stem is moved. The movement of the valve stem may result in thinning of the resilient member. The height of the resilient member may vary.

Figure 13C:
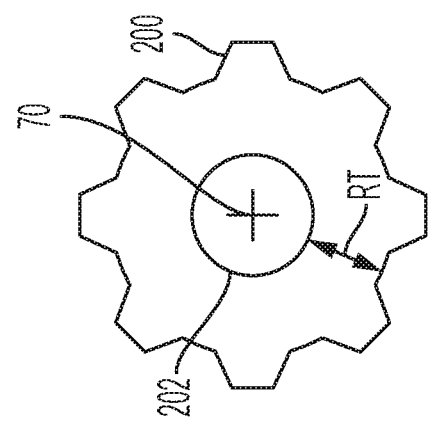
FIG. 13C is a top view of a resilient member.

The resilient member 58 may substantially surround the valve stem 62 and may be any shape that fits with the valve body 54 and delivers the appropriate control of the valve stem 62 while in a sealing, dispensing, and filling configuration. The resilient member 58 may be generally in the shape of a circle, square, rectangle, ellipse, trapezoid, parallelogram, triangle, gear, or any other shape that fits with the valve body and delivers the desired control over the movement of the valve stem. For example, such as illustrated in FIGS. 11 and 13A, the resilient member may be a circular shape and a hexagonal shape, respectively. It is to be appreciated that the shape of the interior surface of the resilient member 58 may be different than the shape of the exterior surface of the resilient member 58. For example, the exterior surface of the resilient member may be gear shaped and the interior of the resilient member may be substantially circular, such as illustrated in FIG. 13C.

The resilient member 58 may have a resilient member thickness RT. The resilient member thickness RT may be the distance measured perpendicular to the longitudinal axis and between the resilient member outer surface 200 and the resilient member inner surface 202. The resilient member thickness RT may be uniform or non-uniform about the longitudinal axis 70. The resilient member thickness may vary along the height of the resilient member. The resilient member thickness may vary in a direction parallel to the longitudinal axis 70. The resilient member thickness RT may be from about 0.5 mm to about 10 mm, or from about 2 mm to about 8 mm, or from about 3 mm to about 6 mm, or from about 3 mm to about 4 mm. The resilient member thickness RT may be greater than about 0.5 mm or greater than about 1 mm or greater than about 2 mm or greater than about 4 mm or greater than about 6 mm or greater than about 8 mm or greater than about 10 mm.

The resilient member 58 may have a cross-section extending in the plane that includes the longitudinal axis and the axis substantially parallel to and coincident with the resilient member thickness RT. The resilient member 58 has a cross-sectional shape. The cross-sectional shape of the resilient member 58 may be substantially circular, rectangular, elliptical, triangular, square, or trapezoidal. The resilient member 58 may have an aspect ratio of the cross-section of from about 0.5 to about 2. The aspect ratio is the ratio of the resilient member thickness to the resilient member height.

The resilient member 58 may be sized such that the resilient member 58 may be disposed between the valve stem 62 and the first attachment protrusion 168. The resilient member 58 may be sized such that the resilient member 58 may be disposed between the valve stem 62 and the second attachment protrusion 168.

Figure 13B:
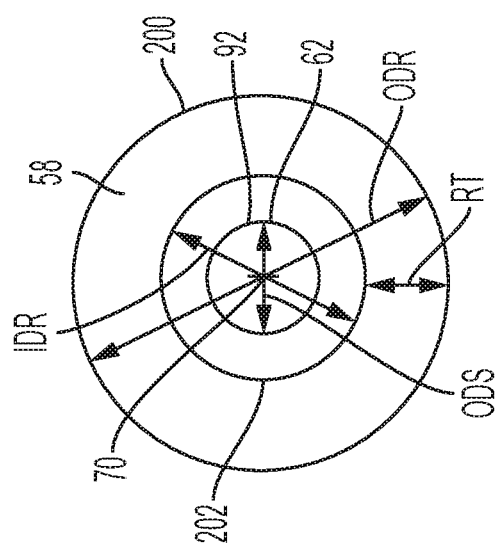
FIG. 13B is a top view of a resilient member.
Figure 13A:
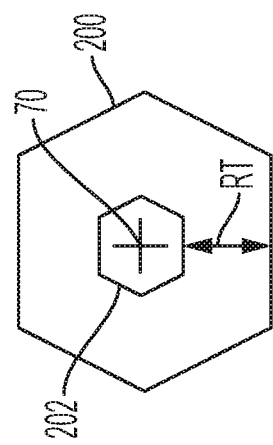
FIG. 13A is a top view of a resilient member.
Figure 14A:
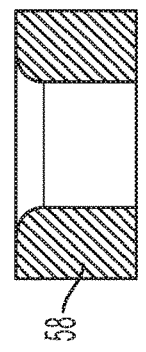
FIG. 14A is a side, sectional view of a resilient member.
Figure 14B:
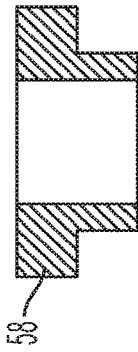
FIG. 14B is a side, sectional view of a resilient member.
Figure 14C:
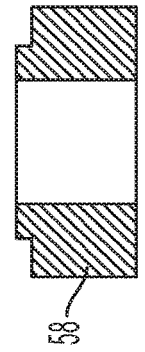
FIG. 14C is a side, sectional view of a resilient member.
Figure 14D:
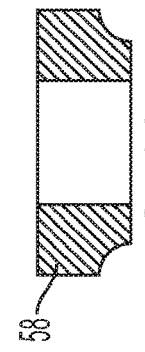
FIG. 14D is a side, sectional view of a resilient member.
Figure 14E:
FIG. 14E is a side, sectional view of a resilient member.
Figure 14F:
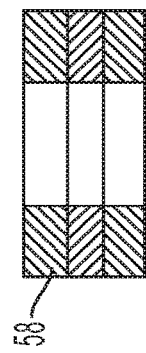
FIG. 14F is a side, sectional view of a resilient member.
Figure 14G:
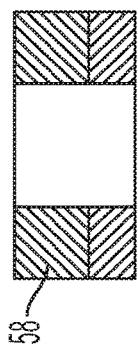
FIG. 14G is a side, sectional view of a resilient member.
Figure 14H:
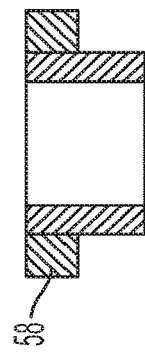
FIG. 14H is a side, sectional view of a resilient member.
Figure 14I:
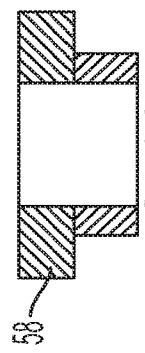
FIG. 14I is a side, sectional view of a resilient member.
Figure 14J:
FIG. 14J is a side, sectional view of a resilient member.

As illustrated in FIGS. 11 and 13B, the resilient member 58 may be substantially annular. As such, the resilient member 58 may include an inner diameter IDR and an outer diameter ODR. The valve stem 62 may have an outer diameter ODS measured from the outer stem surface 92. The inner diameter IDR of the resilient member 58 may be greater than the outer diameter ODS of the valve stem 62 to allow for movement of the valve stem through the resilient member. The resilient member inner diameter IDR may be from about 5% to about 50% greater than the valve stem outer diameter ODS. The inner diameter IDR may be from about 4 mm to about 6 mm and/or from about 4 mm to about 7 mm. The outer diameter ODR may be from about 10 mm to about 15 mm. The outer diameter ODR of the resilient member 58 may be less than the outer diameter of the valve body measured to the outer surface 72 of the valve body such that the resilient member fits within the valve body 54. A gap may be present between the outer surface 200 of the resilient member and any portion of the valve body 54, such as the first brace member 162 or the second brace member 164. The gap allows for outward expansion of the resilient member 58 during compression of the resilient member 58. The amount of outward expansion, if any, of the resilient member 58 may be based, in part, on the geometry and material properties of the resilient member 58.

The resilient member 58 may be partially supported or fully supported by a portion of the valve body 54. The resilient member 58 may be supported such that about 2% or about 5% or about 10% or about 25% or about 40% or about 50% or about 65% or about 80% or about 100% of the second resilient member surface 192 is supported by a portion of the valve body 54 in the sealing configuration. The resilient member 58 may be supported such that at least about 10% or at least about 25% or at least about 50% or at least about 80% of the second resilient member surface 192 is supported by a portion of the valve body 54 in the sealing configuration. As illustrated in FIG. 11, the second resilient member surface 192 is fully supported by the first valve body surface 96. The first valve body surface 96 extends under the entire second resilient member surface 192. The second resilient member surface 192 may be fully supported by the first hoop member 140 or the second hoop member 142. As illustrated in FIG. 11, the first hoop upper surface 148 fully supports the second resilient member surface 192. It is also to be appreciated that the second hoop upper surface 156 may partially or fully support the second resilient member surface 192.

As illustrated in FIGS. 5A-D, 7A, and 12, the second resilient member surface 192 may be partially supported by the first valve body surface 96. A portion of the second resilient member surface 192 may be supported by the first valve body surface 192. A portion of the second resilient member surface 192 is disposed on the first valve body surface 192 and a portion of the second resilient member surface 192 is unsupported by the first valve body surface 192. A gap 194 may be formed between a portion of the first valve body surface 192 and the second resilient member surface 192, such as illustrated in FIGS. 5A-D, 7A, and 12. The size of the gap 194 may depend on the geometry of the valve body 54 and the resilient member 58. The gap 194 may be present when the valve stem 62 is in a sealing configuration and when the valve stem 62 is moved to both a dispensing configuration and a filling configuration. The gap 194 may be present when the valve stem 62 is in a sealing configuration and when the valve stem 62 is in a dispensing configuration but may or may not be present during the filling configuration. When the resilient member 58 is compressed such that the unsupported portion of the second resilient member surface engages and is supported by, at least in part, the first valve body surface 96 the gap 194 may not be present or the area of the gap may be reduced. The gap 194 may be present when the valve stem 62 is in a sealing configuration and the gap 194 may not be present when the valve stem 62 is in a dispensing and/or a filling configuration. The compression of the resilient member 58 to the dispensing configuration or the filling configuration may result in the unsupported portion of the second resilient member surface engaging the first valve body surface 192 and, thus, that portion of the resilient member 58 becomes supported by, at least in part, the first valve body surface 96.

As illustrated in FIGS. 7A and 12, the resilient member 58 may include a first resilient member portion 196 and a second resilient member portion 198. The first resilient member portion 196 may be supported by a portion of the first valve body surface 96. The first resilient member portion 196 may be supported by a portion of the first hoop member 140. The first resilient member portion 196 may be disposed between the upper portion of the first valve body surface 96 and the second engagement surface of the engagement member. The first resilient member portion 196 may be in contact with the engagement member and a portion of the first valve body surface 96. The first resilient member portion 196 may be disposed between a portion of the first hoop member 140 and the second engagement surface of the engagement member. The first resilient member portion 196 may be in contact with the engagement member and a portion of the first hoop member 140.

The second resilient member portion 198 may extend beyond the upper portion of the first valve body surface 96 such that the second resilient member portion is at least partially unsupported by the upper portion of the first valve body surface 96. The second resilient member portion 198 may extend over a portion of the lower portion of the first valve body surface 96 such that a gap 194 is present between the second resilient member portion 198 and the lower portion of the first valve body surface 96. The second resilient member portion 198 may extend beyond the first hoop member 140 such that the second resilient member portion is at least partially unsupported by the first hoop member 140. The second resilient member portion 198 may extend over a portion of the second hoop member 142 such that a gap 194 is present between the second resilient member portion 198 and the second hoop member 142. The gap 194 may be present when the valve stem 62 is positioned in the sealing configuration and the gap 194 may or may not be substantially closed as the valve stem 62 is positioned in the dispensing configuration or the filling configuration. In the sealing configuration, a portion of the engagement member may be disposed on the second resilient member portion 198 and a gap may be present between the resilient member and the lower portion of the first valve body surface 96. As the valve stem 62 is moved, the second resilient member portion 198 may be compressed, moving the second resilient member portion 198 towards the lower portion of the first valve body surface 96. The second resilient member portion 198 may contact the lower portion of the first valve body surface 96 when the valve stem is in the dispensing configuration and/or the filling configuration.

The first resilient member portion 196 may have a first resilient member height and the second resilient member portion 198 may have a second resilient member height. The first resilient member height and the second resilient member height may be the same or different. The first resilient member portion 196 may have a first resilient member thickness and the second resilient member portion 198 may have a second resilient member thickness. The first resilient member thickness and the second resilient member thickness may be the same or different. The first resilient member portion 196 may be made from a first material and the second resilient member portion 198 may be made from a second material, and the first material may be the same as or different than the second material.

It is also to be appreciated that at least one of the first resilient member surface 190 and the second engagement member surface 188 may be shaped such that a gap is formed between the first resilient member surface 190 and the second engagement member surface 188. The gap may be present when the valve stem 62 is in a sealing configuration and may continue to be present or may be absent as the valve stem 62 is moved to a dispensing configuration or a filling configuration.

The resilient member 58 may be a unitary member, such as illustrated in FIGS. 11, 12, 14A-14E, or a multi-piece member, such as illustrated in FIGS. 14F-14J. A multi-piece resilient member includes one or more distinct members that are positioned to form a resilient member 58. The one or more members may be made from the same material or different material. The one or more members may be different shapes and sizes or the same shapes and sizes. The unitary member includes a single member with one or more portions. The one or more portions may include different or the same materials and may be different shapes and sizes or the same shapes and sizes. The resilient member may include one or more notches and/or apertures.

The resilient member 58 may be made from a resilient polymeric material such as a thermoset material, a thermoplastic material, or a plastomer. The resilient polymeric material may include a non-cross-linked material. The resilient polymeric material may include a melt-processible material. The thermoplastic material may contain cross-liked polymer chains but remain melt processible. The resilient member may be made entirely from one or more non-cross-linked resilient polymeric materials. The resilient member may be made entirely from one or more melt-processible resilient polymeric materials. The resilient polymeric material may be modified such as by means of additives or by foaming to alter its properties.

The resilient member may comprise one or more thermoplastic elastomers (TPE). The thermoplastic elastomer may be a styrenic block copolymers (TPS), thermoplastic polyolefin elastomers (TPO), thermoplastic elastomer vulcanizates (TPV), thermoplastic polyurethane elastomers (TPU), thermoplastic copolyester elastomers (TPC), thermoplastic polyamide elastomers (TPA), non-classified thermoplastic elastomers (TPZ), and combinations thereof.

To aid with recyclability of the container, the resilient member may include at least one of a non-cross-linked material and a melt-processible material or the resilient member may be made entirely from one or more non-cross-linked, melt-processible materials. Further, the resilient member 58 may have a density that would allow the resilient member 58 to be float-separable during the recycling process. The resilient member 58 may have a density less than 1.0 g/cc.

The resilient member 58 may have a durometer greater than about 5 Shore A hardness or greater than about 10 Shore A hardness, or greater than about 20 Shore A hardness. The durometer of the thermoplastic elastomer may be from about 5 Shore A hardness to about 60 Shore A hardness or from about 10 Shore A hardness to about 50 Shore A hardness or from about 15 Shore A hardness to about 40 Shore A hardness or from about 20 Shore A hardness to about 35 Shore A hardness, including a 1.0 increment between the recited ranges. It is to be appreciated that foaming a material will change the durometer.

The resilient member 58 may be used to control the movement of the valve stem 62. The resilient member 58 may be made from a material that compresses linearly. The resilient member 58 may be made from a material that compresses non-linearly, and thus, has a non-linear compression profile. For a non-linear compression profile, the force required to compress the resilient member, force to compress (FtC), does not change linearly with the amount of compression. As the valve stem 62 is moved from the sealing configuration to the dispensing configuration and the filling configuration the force to compress the resilient member 58 changes. The force to compress the resilient member 58 does not change linearly with the movement of the valve stem 62.

The resilient member 58 may be preloaded such that the resilient member 58 is compressed an initial distance to bias the valve stem in a direction toward the valve body or in a sealing configuration. To preload the resilient member 58 the engagement member may apply a force of from about 2 N to about 20 N or from about 3 N to about 15 N or from about 5 N to about 10 N. To preload the resilient member 58 the engagement member may apply a force of less than about 10 N or less than about 8 N or less than about 5 N.

As the valve stem 62 is moved from the sealing configuration to the dispensing configuration, the resilient member 58 is further compressed. The force needed to compress the resilient member 58 to allow the valve stem 62 to reach the dispensing configuration is from about 12 N to about 30 N or from about 15 N to about 25 N. The force needed to compress the resilient member 58 to allow the valve stem 62 to reach the dispensing configuration is greater than about 10 N or greater than about 12 N or greater than about 15 N or greater than about 25 N.

As the valve stem 62 is moved from the dispensing configuration to the filling configuration, the resilient member 58 is further compressed. The force needed to compress the resilient member 58 to allow the valve stem 62 to reach the filling configuration is greater than about 30 N or greater than about 40 N or greater than about 45 N or greater than about 50 N or greater than about 60 N. The force to compress the resilient member 58 to position the valve stem in the filling configuration is relatively higher than the force needed to compress the resilient member 58 to position the valve stem in the dispensing configuration. The force to compress the resilient member to position the valve stem in the filling configuration is greater than the force to compress the resilient member to position the valve stem in the dispensing configuration because it would be undesirable to have the consumer, at least during normal, intended use of the aerosol dispenser, to be able to move the valve stem 62 to a position that would allow for unintended dispensing of product, such that a relatively greater amount of product is dispensed. It is to be appreciated that the one or more orifices used to dispense product may also be used to fill product and/or propellant, and a separate set of orifices used only for filling product and/or propellant may not be used. Thus, the aerosol may or may not include one or more orifices for dispensing and one or more offices for filling, but rather, including only one or more orifices for dispensing product and/or propellant. It is also to be appreciated that the force to compress and force to return of the resilient member will change based on the geometry and material properties of the resilient member.

Figure 15:
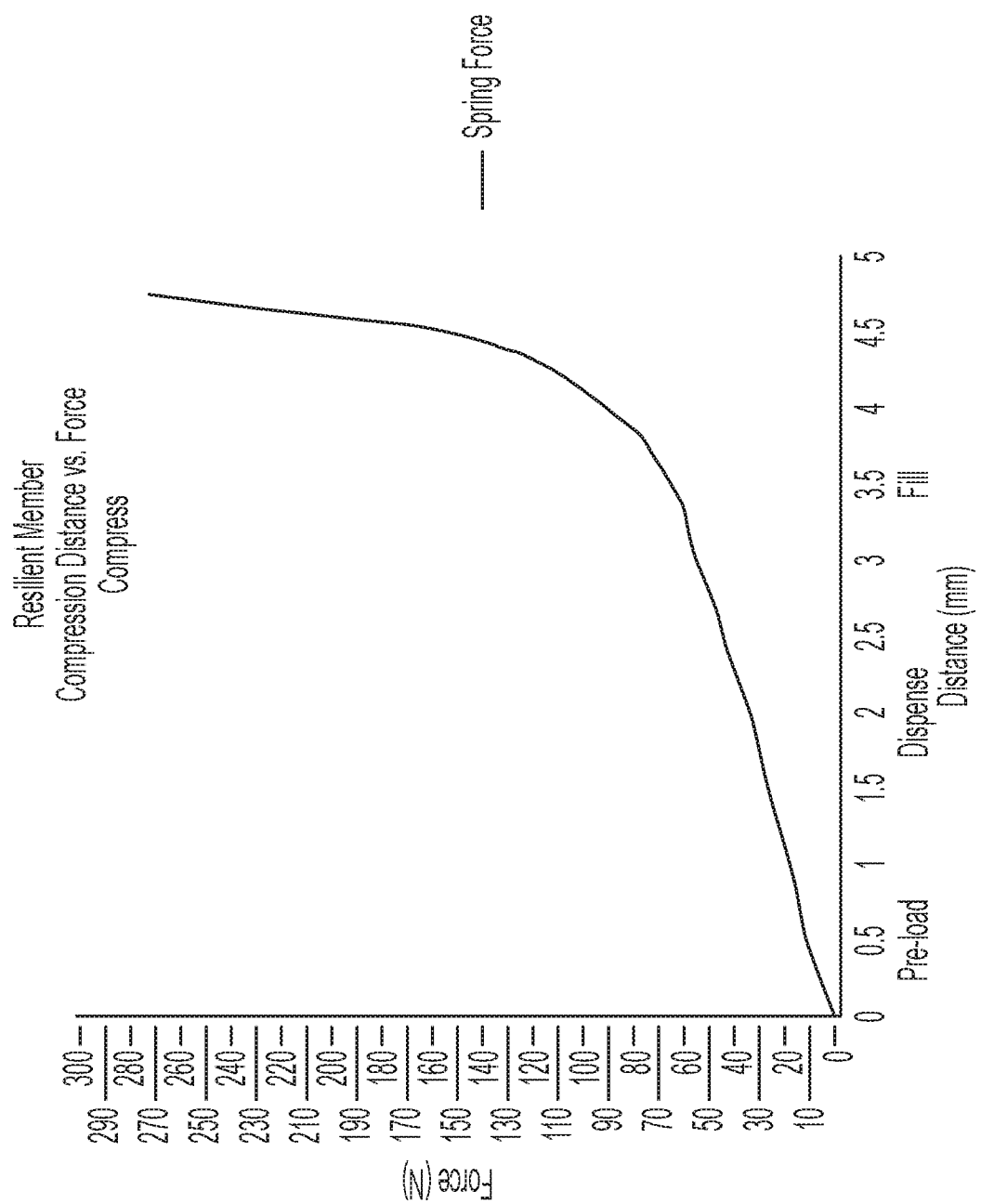
FIG. 15 is a graph of the resilient member force vs. distance of compression of the resilient member.

As illustrated in FIG. 15, the resilient member 58 may be preloaded such that the resilient member 58 is compressed about 0.5 mm. To preload the resilient member 58 the engagement member applies a force of about 12 N. As the valve stem 62 is moved from the sealing configuration to the dispending configuration, the resilient member 58 is further compressed about 1.5 mm, for a total compression of about 2.0 mm. The force needed to compress the resilient member 58 to allow the valve stem 62 to reach the dispensing configuration is from about 25 N to about 35 N. As the valve stem 62 is moved from the dispensing configuration to the filling configuration, the resilient member 58 is compressed further for a total compression of at least about 3.0 mm. The force needed to compress the resilient member 58 to allow the valve stem 62 is reach the filling configuration is greater than about 60 N.

The resilient member may have a force-to-compress (FtC) of less than about 60 N in order to ensure that a consumer is able to actuate the aerosol dispenser. Actuate refers to the valve stem 62 being moved from the sealing configuration to the dispensing configuration. It is to be appreciated that while the force to compress the resilient member contributes to the force the consumer must apply to activate the aerosol dispenser, other factors such as the type of actuator may further contribute to the force the user, or consumer, must apply to activate the aerosol dispenser. For example, in a push-button actuator, the consumer-applied force translates directly to the valve stem in order to activate the aerosol dispenser, while in a trigger-sprayer, the trigger element provides the consumer with additional leverage whereby a lesser consumer-applied force can achieve a higher force-to-compress on the resilient member. The force to compress the resilient member may be higher for an aerosol dispenser that has a trigger element to dispense product than an aerosol dispenser that has a push-button to dispense product. The mechanical advantage of the type of actuator may be a consideration in selecting a material for the resilient member that has a desirable force to compress.

Stated another way, actuator configurations such as a trigger sprayer generally have the effect of reducing the user-applied force required to compress the resilient member, relative to the force required by a push-button configuration. The push-button actuator generally has the higher consumer-applied force requirement than alternate actuator configurations as the consumer-applied force is translated directly to the resilient member. The resilient member may have a force-to-compress that is less than about 60 N, less than about 50 N, less than about 40 N, less than about 35 N, less than about 30 N or less than about 25 N.

The aerosol dispenser is configured such that the valve stem returns to a sealing configuration when the consumer applied force is removed. The force required to return the valve stem from the dispensing or filling configuration to the sealing configuration is the force to recover (FtR). The resilient member may have a force-to-recover of greater than about 5 N to ensure that the resilient member drives the valve stem 62 back to the sealing configuration, in which the orifice 108 is sealed from product and/or propellant. If the resilient member does not provide sufficient force-to-return, the aerosol dispenser may continue to dispense after the consumer has released the actuator. The resilient member may have a force-to-recover that is greater than about 5 N, greater than about 7 N, greater than about 10 N, greater than about 20 N, greater than about 30 N or greater than about 40 N.

TABLE 1A

| Ex. No. | Resilient Member Material | Density (g/cm³) | Durometer Shore A | FtC (N) @ 1.0 mm | FtC (N) @ 1.5 mm | FtC (N) @ 2.0 mm | FtC (N) @ 2.5 mm | FtC (N) @ 3.0 mm | FtC (N) @ 3.5 mm |
|---|---|---|---|---|---|---|---|---|---|
| 1 | THERMOLAST ® K (TPE) (14 × 6 mm diam.) on platen | 0.877 | 18 | 19.19 | 31.90 | 47.40 | 66.06 | 91.63 | 137.85 |
| 2 | THERMOLAST ® K (TPE) (14 × 6 mm diam.) on platen | 0.902 | 33 | 35.21 | 61.96 | 91.39 | 123.30 | 170.33 | 253.44 |
| 3 | THERMOLAST ® K (TPE) (14 × 6 mm diam.) on platen | 0.893 | 35 | 28.22 | 53.97 | 82.89 | 113.84 | 156.87 | 233.20 |
| 4 | Lubrizol Pearlthane (Polyurethane) (14 × 6 mm diam.) | 1.070 | 72 | 133.86 | 246.03 | 372.22 | 518.22 | 680.92 | 856.68 |

TABLE 1B

| Ex. No. | Resilient Member Material | Density (g/cm3) | Durometer Shore A | FtR (N) @ 1.0 mm | FtR (N) @ 1.5 mm | FtR (N) @ 2.0 mm | FtR (N) @ 2.5 mm | FtR (N) @ 3.0 mm | FtR (N) @ 3.5 mm |
|---|---|---|---|---|---|---|---|---|---|
| 1 | THERMOLAST ® K (TPE) (14 × 6 mm diam.) on platen | 0.877 | 18 | 3.23 | 8.20 | 14.27 | 23.51 | 38.71 | 72.99 |
| 2 | THERMOLAST ® K (TPE) (14 × 6 mm diam.) on platen | 0.902 | 33 | 13.00 | 27.85 | 44.91 | 66.99 | 104.43 | 184.90 |
| 3 | THERMOLAST ® K (TPE) (14 × 6 mm diam.) on platen | 0.893 | 35 | 9.34 | 21.97 | 39.15 | 58.86 | 92.25 | 165.82 |
| 4 | Lubrizol Pearlthane (Polyurethane) (14 × 6 mm diam.) | 1.070 | 72 | 24.42 | 70.69 | 133.53 | 218.04 | 349.65 | 581.73 |

Note: The materials of Examples 1-3 were supplied by Kraiburg. The material of Example 4 was supplied by Lubrizol.

TABLE 2A

| Ex. No. | Resilient Member Material | Density (g/cm3) | Durometer Shore A | FtC (N) @ 1.0 mm | FtC (N) @ 1.5 mm | FtC (N) @ 2.0 mm | FtC (N) @ 2.5 mm | FtC (N) @ 3.0 mm | FtC (N) @ 3.5 mm |
|---|---|---|---|---|---|---|---|---|---|
| 5 | THERMOLAST ® K (TPE) (14 × 8 mm diam.) on platen | 0.877 | 18 | 8.17 | 14.26 | 16.56 | 15.86 | 18.94 | 28.67 |
| 6 | THERMOLAST ® K (TPE) (14 × 8 mm diam.) on platen | 0.902 | 33 | 18.21 | 29.57 | 31.79 | 34.03 | 41.72 | 66.00 |
| 7 | THERMOLAST ® K (TPE) (14 × 8 mm diam.) on platen | 0.893 | 35 | 15.23 | 25.76 | 30.32 | 33.67 | 42.32 | 62.77 |
| 8 | Lubrizol Pearlthane (Polyurethane) (14 × 8 mm diam.) | 1.070 | 72 | 117.68 | 201.05 | 295.27 | 340.60 | 351.42 | 417.40 |
| 9 | Lubrizol BCX33 Polyester Thermoplastic Polyurethane (TPU) (14 × 8 mm diam.) | 1.170 | 77 | 197.35 | 319.91 | 427.17 | 446.18 | 420.09 | 456.00 |

TABLE 2B

| Ex. No. | Resilient Member Material | Density (g/cm3) | Durometer Shore A | FtR (N) @ 1.0 mm | FtR (N) @ 1.5 mm | FtR (N) @ 2.0 mm | FtR (N) @ 2.5 mm | FtR (N) @ 3.0 mm | FtR (N) @ 3.5 mm |
|---|---|---|---|---|---|---|---|---|---|
| 5 | THERMOLAST ® K (TPE) (14 × 8 mm diam.) on platen | 0.877 | 18 | 1.70 | 2.35 | 3.10 | 4.63 | 7.45 | 16.61 |
| 6 | THERMOLAST ® K (TPE) (14 × 8 mm diam.) on platen | 0.902 | 33 | 6.48 | 11.82 | 12.88 | 14.93 | 21.64 | 44.78 |
| 7 | THERMOLAST ® K (TPE) (14 × 8 mm diam.) on platen | 0.893 | 35 | 5.68 | 11.46 | 15.25 | 17.38 | 22.53 | 40.77 |

TABLE 2B-continued

| Ex. No. | Resilient Member Material | Density (g/cm3) | Durometer Shore A | FtR (N) @ 1.0 mm | FtR (N) @ 1.5 mm | FtR (N) @ 2.0 mm | FtR (N) @ 2.5 mm | FtR (N) @ 3.0 mm | FtR (N) @ 3.5 mm |
|---|---|---|---|---|---|---|---|---|---|
| 8 | Lubrizol Pearlthane (Polyurethane) (14 × 8 mm diam.) | 1.070 | 72 | 30.02 | 54.11 | 72.91 | 91.75 | 133.57 | 246.72 |
| 9 | Lubrizol BCX33 Polyester Thermoplastic Polyurethane (TPU) (14 × 8 mm diam.) | 1.170 | 77 | 56.43 | 78.50 | 92.95 | 106.56 | 142.12 | 265.43 |

Note: The materials of Examples 5-7 were supplied by Kraiburg. The materials of Examples 8 and 9 were supplied by Lubrizol.

Tables 1A, 1B, 2A, and 2B include the force-to-compress (FtC) and force-to-recover (FtR) for a number of resilient members 58 made from different materials having a variety of durometers. Tables 1A and 1B include examples of the resilient member that are configured as an annulus with a resilient member height RH of 6 mm, an outer diameter of 14 mm, and an inner diameter of 6 mm Tables 2A and 2B include examples of the resilient member 58 that are configured as an annulus with a resilient member height RH of 6 mm, an outer diameter of 14 mm, and an inner diameter of either 6 mm or 8 mm. For Tables 1A, 1B, 2A and 2B, the FtC and FtR measurements are taken on a flat-surface so that the entirety of the resilient member is supported during the measurements. As can be seen, the FtC values and FtR values generally follow, but are not entirely correlated with, the durometers values.

TABLE 3A

| Ex. No. | Resilient Member Material | In Valve? | Density (g/cm3) | Durometer Shore A | FtC (N) @ 1.0 mm | FtC (N) @ 1.5 mm | FtC (N) @ 2.0 mm | FtC (N) @ 2.5 mm | FtC (N) @ 3.0 mm | FtC (N) @ 3.5 mm |
|---|---|---|---|---|---|---|---|---|---|---|
| 10 | THERMOLAST ® K (TPE) (14 mm × 8 mm diam) | No | 0.893 | 35 | 15.23 | 25.76 | 30.32 | 33.67 | 42.32 | 62.77 |
| 11 | THERMOLAST ® K (TPE) (14 mm × 7 mm diam) | No | 0.893 | 35 | 20.65 | 40.40 | 63.50 | 86.83 | 107.83 | 128.55 |
| 12 | THERMOLAST ® K (TPE) (14 mm × 6 mm diam) | No | 0.893 | 35 | 28.22 | 53.97 | 82.89 | 113.84 | 156.87 | 233.20 |
| 13 | THERMOLAST ® K (TPE) (14 mm × 8 mm diam) | Yes | 0.893 | 35 | 1.59 | 4.52 | 8.37 | 12.50 | 16.89 | 20.19 |
| 14 | THERMOLAST ® K (TPE) (14 mm × 7 mm diam) | Yes | 0.893 | 35 | 5.47 | 9.74 | 15.35 | 23.12 | 31.52 | 40.04 |
| 15 | THERMOLAST ® K (TPE) (14 mm × 6 mm diam) | Yes | 0.893 | 35 | 8.53 | 13.55 | 19.91 | 28.09 | 38.49 | 50.94 |

TABLE 3B

| Ex. No. | Resilient Member Material | In Valve? | Density (g/cm3) | Durometer Shore A | FtR (N) @ 1.0 mm | FtR (N) @ 1.5 mm | FtR (N) @ 2.0 mm | FtR (N) @ 2.5 mm | FtR (N) @ 3.0 mm | FtR (N) @ 3.5 mm |
|---|---|---|---|---|---|---|---|---|---|---|
| 10 | THERMOLAST ® K (TPE) (14 mm × 8 mm diam) | No | 0.893 | 35 | 5.68 | 11.46 | 15.25 | 17.38 | 22.53 | 40.77 |
| 11 | THERMOLAST ® K (TPE) (14 mm × 7 mm diam) | No | 0.893 | 35 | 7.20 | 13.79 | 22.37 | 30.22 | 42.27 | 78.48 |
| 12 | THERMOLAST ® K (TPE) (14 mm × 6 mm diam) | No | 0.893 | 35 | 9.34 | 21.97 | 39.15 | 58.86 | 92.25 | 165.82 |
| 13 | THERMOLAST ® K (TPE) (14 mm × 8 mm diam) | Yes | 0.893 | 35 | 0.38 | 1.36 | 2.40 | 4.67 | 7.61 | 11.83 |
| 14 | THERMOLAST ® K (TPE) (14 mm × 7 mm diam) | Yes | 0.893 | 35 | 1.09 | 4.27 | 8.52 | 14.29 | 20.31 | 27.89 |
| 15 | THERMOLAST ® K (TPE) (14 × 6 mm diam) | Yes | 0.893 | 35 | 3.78 | 8.25 | 13.05 | 19.53 | 29.19 | 43.24 |

Note: The materials of Examples 10-15 were supplied by Kraiburg.

Tables 3A and 3B include the force-to-compress (FtC) and force-to-recover (FtR) for a series of resilient members formed from a given resilient member material in a number of different geometric configurations that also incorporate the geometry of the valve body.

In examples 10, 11, and 12, the resilient member is configured as an annulus with a resilient member height of 6 mm, an outer diameter of 14 mm, and an inner diameter varying from 6 mm to 8 mm, with the FtC and FtR taken on a flat-surface so that the entirety of the resilient member was supported when determining the FtC and FtR. The data indicates an increasing FtC with decreasing inner diameter, which would be consistent with an increasing overall mass of the resilient member with a decreasing inner diameter.

Examples 13, 14, and 15 show the FtC and FtR of the resilient member as incorporated into a representative valve body, such as illustrated in FIG. 5A. In this configuration, the resilient member is partially supported by the upper portion of the first valve body surface or the first hoop upper surface 148 and partially unsupported by the upper portion of the first valve body surface or the first upper hoop surface 148 so that the inner portion of the annular resilient member overhangs the lower portion of the first valve body surface or the second hoop upper surface without contacting it. In this configuration, the resilient member functions in part as a compression spring, and in part as a leaf spring.

As shown in Tables 3A and 3B, the relative geometries of the annular resilient member and the valve body geometry can have a significant effect on the FtC and FtR. For example, while the data in rows 2 and 3 have relatively high FtC values at 2 mm displacement when fully supported, these same resilient members, which corresponds to the data in rows 5 and 6, have relatively lower FtC values at 2 mm displacement when incorporated into the valve body.

Note: The materials of Examples 16-20 were supplied by Kraiburg.

Tables 4A and 4B include the force-to-compress (FtC) and force-to-recover (FtR) for a number of resilient members 58 made from different materials. Examples 16 and 17 include FtC and FtR information for resilient members that are configured as an annulus with a resilient member height RH of 3 mm, an outer diameter of 12 mm, and an inner diameter of 5 mm Example 16 includes the FtC and FtR for a resilient member tested on a flat-surface so that the entirety of the resilient member is supported during the measurements, and Example 17 includes the FtC and FtR for a resilient member tested within the valve that included four force concentrators on the engagement member and four force concentrators on the valve body, which were offset. Examples 18 and 19 include FtC and FtR information for resilient members that are configured as an annulus with a resilient member height RH of 7 mm, an outer diameter of 12 mm, and an inner diameter of 5 mm Example 18 includes the FtC and FtR for a resilient member tested on a flat-surface so that the entirety of the resilient member is supported during the measurements, and Example 19 includes the FtC and FtR for a resilient member tested within the valve that included four force concentrators on the engagement member and four force concentrators on the valve body, which were offset. Example 20 includes the FtC and FtR for a resilient member shaped as an o-ring and having an inner diameter 7.6 mm, an outer diameter of 11.2 mm, and a circular cross-sectional diameter of 1.78 mm Example 20 includes the FtC and FtR for a resilient member tested with the valve that included four force concentrators on the engagement member and four force concentrators on the valve body, which were offset. As illustrated in Tables 4A and 4B, the FtC values and FtR values may be changed by the geometry of the valve, such as the force concentrators. The force concentrators may be used to reduce the FtC and the FtR.

TABLE 4A

| Ex. No. | Resilient Member Material | In Valve? | Density (g/cm³) | Durometer Shore A | FtC (N) @ 1.0 mm | FtC (N) @ 1.5 mm | FtC (N) @ 2.0 mm | FtC (N) @ 2.5 mm | FtC (N) @ 3.0 mm | FtC (N) @ 3.5 mm |
|---|---|---|---|---|---|---|---|---|---|---|
| 16 | Kraiburg HTF8796-36 (TPE) (12 mm × 5 mm diam) | No | .886 | 30 | 71.8 | 161.7 | 392.6 | 894 | — | — |
| 17 | Kraiburg HTF8796-36 (TPE) (12 mm × 5 mm diam) | Yes | .886 | 30 | 5.6 | 8.5 | 11.3 | 13.9 | 19.5 | 34.0 |
| 18 | Kraiburg HTF8796-36 (TPE) (12 mm × 5 mm diam) | No | .886 | 30 | 15.3 | 29.5 | 45.2 | 60.8 | 78.3 | 103.6 |
| 19 | Kraiburg HTF8796-36 (TPE) (12 mm × 5 mm diam) | Yes | .886 | 30 | 3.6 | 7.4 | 11.4 | 15.6 | 19.8 | 24.5 |
| 20 | Kraiburg HTF9343-239 (TPE) (o-ring design) | Yes | .908 | 63 | 4.5 | 7.0 | 10.2 | 14.4 | 19.9 | 26.7 |

TABLE 4B

| Ex. No. | Resilient Member Material | In Valve? | Density (g/cm3) | Durometer Shore A | FtR (N) @ 1.0 mm | FtR (N) @ 1.5 mm | FtR (N) @ 2.0 mm | FtR (N) @ 2.5 mm | FtR (N) @ 3.0 mm | FtR (N) @ 3.5 mm |
|---|---|---|---|---|---|---|---|---|---|---|
| 16 | Kraiburg HTF8796-36 (TPE) (12 mm × 5 mm diam) | No | .886 | 30 | 17.9 | 80.0 | 249.8 | 894 | — | — |
| 17 | Kraiburg HTF8796-36 (TPE) (12 mm × 5 mm diam) | Yes | .886 | 30 | 3.7 | 6.5 | 9.2 | 11.8 | 16.2 | 28.8 |
| 18 | Kraiburg HTF8796-36 (TPE) (12 mm × 5 mm diam) | No | .886 | 30 | 11.0 | 24.5 | 39.3 | 59.2 | 72.7 | 103.6 |
| 19 | Kraiburg HTF8796-36 (TPE) (12 mm × 5 mm diam) | Yes | .886 | 30 | 2.2 | 5.4 | 9.2 | 13.1 | 17.4 | 22.6 |
| 20 | Kraiburg HTF9343-239 (TPE) (o-ring design) | Yes | .908 | 63 | 1.5 | 3.0 | 5.1 | 8.1 | 13.3 | 26.7 |

Aerosol dispensers are pressurized, such as with propellant. Thus, the internal pressure of the container may aid in forming the seal between the valve assembly and the container. To dispense product and/or propellant from the container, a user may directly or indirectly, such as by use of an actuator, engage the valve stem 62 causing the valve stem 62 to move. Upon engagement, the valve stem 62 may move along or within the passageway surface 80. The valve stem 62 may move from a first position, a sealing configuration, to a second position, a dispensing configuration. In a dispensing configuration, the valve stem 62 is moved such that the seal between the valve stem and the valve seal in the area of the orifice is broken. Stated another way, the valve stem 62 may be moved such that the portion of the valve stem including an orifice loses engagement with the valve seal. Propellant and/or product may then flow through the orifice and into the channel 95. Upon disengagement of the valve stem 62, the valve stem 62 may move and the portion of the valve stem including the orifice may re-engage the valve seal to once again form a seal between the valve seal and the valve stem. Upon re-engagement of the seal, product and/or propellant may no longer flow to the orifice 108.

The valve stem 62 may be positioned in a dispensing configuration upon the actuator being engaged by a user. Thus, the force required to move the valve stem 62 from a sealing configuration to a dispensing configuration is that typically provided by a user. It is to be appreciated that the valve stem 62 may include one or more orifices for dispensing product. However, in some embodiments, additional orifices may be included in the valve stem 62 for filling the container. Due to the placement of these additional orifices being closer to the first portion 86 of the valve stem 62 a greater force is required to move the valve stem 62 to a position such that product and/or propellant may flow through these orifices and to or from the container.

More specifically, the valve stem 62 may be moved such that the portion of the valve stem including the filling orifice is placed in fluid communication with the interior of the container. The disengagement of the seal between the valve seal and the valve stem in the portion of the valve stem including the filling orifice may be due to the portion of the valve stem 62 including the filling orifice extending beyond the second passageway opening 78 of the valve body 54, which allows product and/or propellant to flow through the filling orifice. This position of the valve stem 62 may be referred to as a filling configuration. The filling configuration may be used, for example, to introduce product and/or propellant into the container during manufacture of the aerosol dispenser. Allowing product and/or propellant to be introduced through multiple orifices may relatively shorten manufacturing times by filling the container more quickly. Also, by having orifices that are positioned along the valve stem, the orifices may be different sizes and those sizes may be selected such that they are best suited for the particular function of the dispenser. For example, a first orifice positioned between the retaining member and the second portion of the valve stem 62 may be sized to allow for product dispensing and a second orifice positioned between the first orifice and the first portion of the valve stem may be sized to allow for filling of the dispenser. For example, the orifice for product dispensing may be smaller than the orifice for filling the dispenser. It is to be appreciated that the filling configuration may also be used for dispensing. For example, a dispenser may have a first dispensing rate when the stem is positioned in the dispensing configuration and a second dispensing rate, which may be greater than the first dispensing rate, when the stem is positioned in the filling configuration. Each of the orifices may be used for at least one of dispensing and filling product and/or propellant.

It is to be appreciated that product and/or propellant may pass through the orifices in either direction. Product and/or propellant may flow from the container, through the orifice and into the channel 95 or may flow from the channel 95, through the orifice and into the container. The channel 95 may be in fluid communication with each of the orifices positioned about the valve stem 62. It is also to be appreciated that the valve stem 62 may include any number of orifices.

The valve assembly may be configured such that to fill the container, product and/or propellant may pass through one or more orifices defined by the valve stem and/or around the outer stem surface 92. Thus, product and/or propellant may flow into the container through the channel 95 and orifices 108 of the valve stem and/or around the outer stem surface 92 of the valve stem. Allowing product and/or propellant to be filled through multiple pathways through the valve assembly and into the container may provide for relatively faster filling of the container. For example, the filling configuration may not require an orifice in the valve stem 62 in fluid communication with the product delivery device 56, but rather may include the condition that the product delivery device 56 be in fluid communication, by way of the passageway 74, with a filling apparatus sealed radially about the passageway.

As previously discussed, the valve assembly 52 may include an engagement member 68. The engagement member 68 may be joined to a portion of the valve stem 62 such that the engagement member 68 moves as the valve stem 62 moves. The engagement member 68 may extend from the outer stem surface 92 towards the outer surface 72 of the valve body 54, such as illustrated in FIG. 16A. The engagement member 68 may be axisymmetric or non-axisymmetric. The engagement member 68 includes an engagement surface 69, such as illustrated in FIG. 16B. The engagement surface 69 may be configured to operatively engage a portion of the resilient member 58. The resilient member 58 may be positioned between the engagement surface and a portion of the valve body 54. When the valve stem 62 is in a sealing configuration, the engagement surface 69 may operatively engage the resilient member 58 such that the resilient member 58 is placed under a desired amount of compression which biases the valve stem 62 to remain in a position such that a seal is maintained. When the valve stem 62 is in a dispensing configuration, a user or other mechanical device may overcome a force of the resilient member to move the valve stem 62 from the sealing configuration to the dispensing configuration or filling configuration. As the valve stem 62 moves from the sealing configuration to the dispensing configuration, the engagement member 68 compresses the resilient member 58.

The engagement surface 69 of the engagement member 68 may include one or more force concentrators 124, such as illustrated in FIGS. 16A and 16B. The one or more force concentrators 124 may be joined to the engagement member 68. The one or more force concentrators 124 may be integrally molded with the engagement member 68 or later added to the engagement member 68. The one or more force concentrators 124 may extend from the engagement surface 69 toward the resilient member 58 and be configured to operatively engage the resilient member 58. The one or more force concentrators 124 concentrate the force applied to the resilient member 58 as the valve stem is moved by a user or other mechanical device. The one or more force concentrators may be used to optimize the force to move the valve stem and the ability of the valve stem to remain in the sealing configuration. The total surface area of the portion of the one or more force concentrators that engages the resilient member 58 is less than the total surface area of the resilient member 58 in facing relationship with the one or more force concentrators.

The one or more force concentrators may apply strain to only those portions of the resilient member 58 that are engaged by the one or more force concentrators. The one or more force concentrators 124 may be any shape and size such that a desired force is achieved. For example, the force concentrators may be rectangular, square, conical or tapered, or crescent-shaped. The force concentrators may include a notch or aperture. The one or more force concentrators may extend radially outward from the longitudinal axis or circumferential to the longitudinal axis.

Referring to FIGS. 16A and 16C, the valve body 54 may include one or more force concentrators 124. The one or more force concentrators 124 may be integrally molded with the valve body or later added to the valve body. The one or more force concentrators 124 may extend from the valve body 54 toward the resilient member 68. The resilient member 68 may be disposed on the one or more force concentrators 124 extending from the valve body 54. The one or more force concentrators 124 may be joined to any portion of the valve body 54 such that they operatively engage the resilient member 58. For example, the one or more force concentrators 124 may be joined to the portion of the valve body 54 adjacent to the inner passageway 74. Two or more force concentrators 124 may surround the inner passageway 74 adjacent to the first passageway opening 76. The one or more force concentrators 124 concentrate the force applied to the resilient member 58 as the valve stem is moved by a user or other mechanical device. The one or more force concentrators may be used to optimize the force to move the valve stem and the ability of the valve stem to remain in the sealing configuration. The one or more force concentrators 124 may be any shape and size such that a desired force is achieved, such as previously discussed.

It is to be appreciated that one or more force concentrators 124 may be joined to either the engagement member 68 or the valve body 54. Further, it is to be appreciated that one or more force concentrators 124 may be joined to each of the engagement member 68 and the valve body 54.

For a configuration of the valve assembly where both of the engagement member 68 and the valve body 54 have one or more force concentrators joined thereto, the one or more force concentrators of the valve body 54 may be aligned or offset from the one or more force concentrators of the engagement member 68. For a configuration where the one or more force concentrators of the valve body are offset from the one or more force concentrators of the engagement member, a relatively thinner resilient member may be used because the force concentrators have a greater amount of space in which to travel and act on the resilient member. By contrast, having the one or more force concentrators of the engagement member aligned with the one or more force concentrators of the valve body may require a relatively thicker resilient member to prevent the one or more force concentrators from directly engaging one another and reaching the point that the resilient member is no longer compressible, which may cause the force to move the valve stem to exceed that desired for typical consumer use.

Figure 17B:
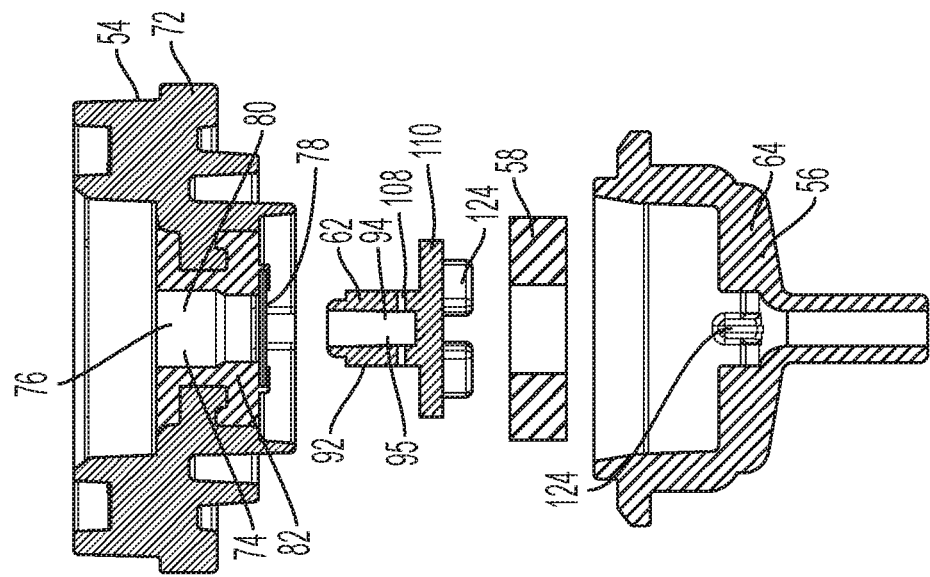
FIG. 17B is a sectional, exploded view of the valve assembly of FIG. 17A.
Figure 17A:
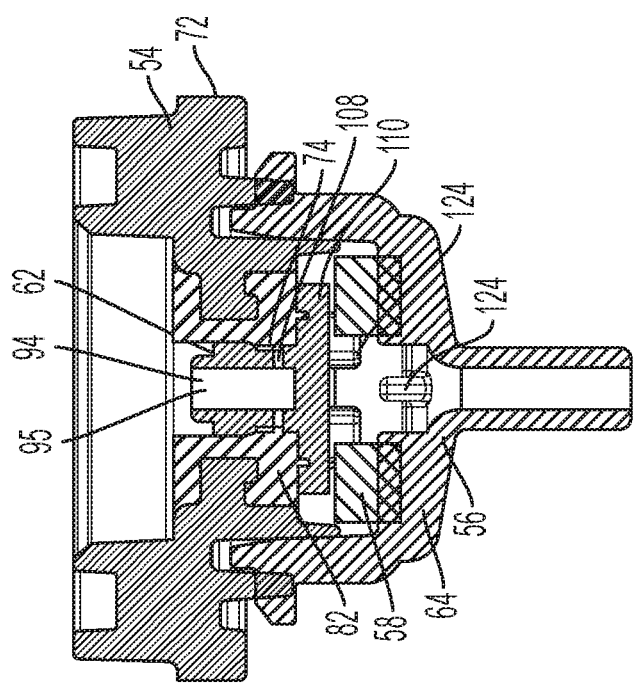
FIG. 17A is a sectional view of a valve assembly including a dip tub adaptor and retaining member that each include one or more force concentrators.

Referring to FIGS. 17A and 17B, the position of the resilient member 58 may be such that the resilient member 58 is between the valve body 54 and the container or a dip tube adaptor 64. Stated another way, the resilient member 58 may be positioned adjacent to the second passageway opening 78 of the inner passageway 74 of the valve body 54. Similar to the above, one or more force concentrators 124 may be joined to the retaining member 110 and/or one or more force concentrators may be joined to the dip tube adaptor 64. The force concentrators are configured to operatively engage the resilient member and create a desired force to move the valve stem.

The one or more force concentrators may be joined to at least one of the valve body 54, retaining member 110, and the engagement member 68 or the one or more force concentrators may be formed as a separate member and added to the valve assembly, such as illustrated in FIGS. 17A-17B. The engagement member 68 includes one or more force concentrators configured to operatively engage a first portion of the resilient member 58 and a force concentrator member 126 may include one or more force concentrators 124 configured to operatively engage a second portion of the resilient member 58. The one or more force concentrators may be shaped to better position and/or hold the resilient member 58. For example, the one or more force concentrators 124 may have a substantially concave shape at the portion of the force concentrator that contacts the resilient member 58.

It is to be appreciated that in any of the aforementioned configurations, the one or more force concentrators may be joined to a separate force concentrator member and the member including the one or more force concentrators may be included in the valve assembly to operatively engage the resilient member.

It is to be appreciated that the valve assembly 52 may be configured such that the valve stem 62 does not extend above at least one of the upper portion of the neck or the upper portion of the valve body, such as illustrated in FIGS. 17A and 17B. Thus, at least one of the upper portion of the neck or the upper portion of the valve body protects the valve stem during manufacture and transport of the partially assembled dispenser. More specifically, when the valve stem extends beyond the upper surface of the neck and/or the upper surface of the valve body and prior to an actuator being joined to the valve stem, the valve stem may be inadvertently engaged allowing product and/or propellant to be dispensed or a portion of the valve stem may get damaged. Alternatively, by positioning the valve stem below the upper portion of the neck and/or the upper portion of the valve body, the valve stem may be protected from inadvertent damage or dispensing.

The aforementioned components of the aerosol dispenser 30 may be polymeric. By polymeric it is meant that the component is formed of a material that includes polymers, and/or particularly polyolefins, polyesters or nylons, and more particularly PET. Thus, the entire aerosol dispenser 30 or, specific components thereof, may be free of metal. The container 32, and all other components, may comprise, consist essentially of or consist of PET, PEF (polyethylene furanoate), PEN (polyethylene naphthlate), Nylon, EVOH or combinations thereof. All or substantially all of the components of the aerosol dispenser, excluding the propellant and product, may be configured to be accepted in a single recycling stream. All such materials, or a majority of the components of the aerosol dispenser 30 (excluding the propellant and product) may be comprised of a single class of resin according to ASTM D7611. Particularly, the majority of the aerosol dispenser 30 by weight may be PET. The majority of the valve assembly by weight may be PET.

A permanent or semi-permanent seal may be used to join any or all of the polymeric components of the aerosol dispenser 30. Particularly, if the components have compatible melt indices, such components may be sealed by welding to retain propellant therein. Suitable welding processes may include sonic, ultrasonic, spin, and laser welding. For example, spin welding provides the benefit that the energy plane is generally confined to a small vertical space, limiting unintended damage of other components not intended to be welded or receive such energy. Welding may be accomplished with a commercially available welder, such as available from Branson Ultrasonics Corp. of Danbury, Conn.

Overpressurization and deformation may occur during heating, either intentionally or inadvertently, of an aerosol dispenser. This overpressurization and deformation may result in rupture of the aerosol dispenser and/or premature loss of propellant and/or product. The valve 52 may be designed such that the deformation is controlled and the release of product and/or propellant is controlled.

The valve stem 62 may be designed, in part, to aid in controlling the overpressurization and deformation of the aerosol dispenser when heated to relatively high temperatures. The valve stem 62 may include a retaining member 110. The retaining member 110 may be positioned at the third portion 90 of the valve stem 62. The retaining member 110 may be a separate member joined to the valve stem 62 or may be integrally formed, such as by molding, during the manufacture of the valve stem 62. The retaining member 110 may be configured to engage a portion of the valve body 54. For example, the retaining member 110 may be configured to engage the portion of the valve body 54 that is adjacent to the second passageway opening 78. The retaining member 110 may be configured to engage any portion of the valve body 54 and/or the valve seal. The retaining member 110 aids in positioning the valve stem 62 with respect to the inner passageway 74 and aids in preventing the valve stem 62 from being adversely ejected from the valve body 54.

During overpressurization of the dispenser, the retaining member 110 may deform and allow the valve stem 62 to move in a direction away from the valve body and/or valve seal, but not be ejected from the valve body. The retaining member 110 may deform in a manner such that the valve stem 62 moves away from the valve body and/or valve seal to create a flow path which allows product and/or propellant to vent or be released and prevents unsafe ejection of the valve stem from the valve body 54 and/or unsafe discharge of product and/or propellant from the container.

The aerosol dispenser including the aforementioned components may be used to safely vent propellant and/or product when the aerosol dispenser is subject to these relatively high temperatures and/or pressures. The valve assembly is designed to allow for release of the product and/or propellant. When the aerosol dispenser is subject to relatively high temperatures, the valve body may pivot about the transition portion, which allows the valve body to move away from the valve stem. The valve stem may separate from the valve seal such that product and/or propellant may flow from the container, through or around the retaining member, which may include one or more voids, such as apertures, slots, and notches. A flow path is created between the valve stem and the valve seal through the movement of the valve body. The movement of the valve body may be away from the container and/or outward toward the neck of the container. The valve body may pivot about the transition portion and also around the valve cavity to allow for movement of the valve body and to form a flow path between the valve seal and the valve stem. The void in the retaining member may also aid in allowing product and/or propellant to be released. The product and/or propellant may pass through the void, such as an aperture and/or slot, or the void may cause the retaining member to deform, such as with respect to the one or more notches. The deformation of the retaining member may provide a flow path from the container through the separated valve seal and valve stem. An aerosol dispenser including the aforementioned components may safely release product and/or propellant.

Test Method

Force to Compress and Force to Recover

The force-to-compress (FtC) and force-to-recover (FtR) is determined using a constant rate of extension tensile tester in compression mode, such as the Stable Micro Systems TA.XT Plus Texture Analyzer with Exponent software (available from Texture Technologies, Hamilton, Mass.) for data collection and analysis, or equivalent. The instrument is configured with a 100 Kg load cell. The test sample is placed below an upper platen and rests on a lower platen. The upper platen is a flat, circular platen aligned orthogonal to the axis of compression, with a diameter greater than the diameter of the test sample. The lower platen is a horizontal, level platform base.

The instrument is programmed for compression mode. The upper platen is lowered at a rate of 0.5 mm/sec until a force of 0.49 N is detected. At this vertical position the test compression begins and, thus, the adjusted gage length is set. The upper platen is lowered at 0.50 mm/sec for 4.0 mm, with a hold time of 0.0 sec. Once 4.0 mm vertical displacement is reached the upper platen immediately is raised at 0.50 mm/sec to the adjusted gage length. The upper platen is then returned to its starting position. Data is recorded at a rate of at least 400 Hz for the compression and recovery cycles.

The FtC and FtR measurements are taken on the resilient member both within the geometry of the valve body and remotely, isolated from the valve body. If the resilient member is a multi-part member, the remote measurement is taken on all the parts together, as they would be arranged within the geometry of the valve-body.

Place the sample, either the resilient member or the valve body containing resilient member, on the platform of the instrument centered under the upper platen. Manually lower the platen to approximately 2 mm above the sample. Zero the distance and force. Start the program and collect both distance and force data.

Construct a Distance (mm) versus Force (N) curve including both the compression and recovery cycle. At a specified distance, read the force value from the compression cycle and record as FtC @ X mm (where X is the compression distance) to the nearest 0.01 N. At the same specified distance, read the force value from the recovery cycle and record as FtR @ X mm (where X is the compression distance) to the nearest 0.01 N. Repeat measurements on a total of 3 replicate samples for both the isolated resilient member and the valve body with resilient member and report values as the average to the nearest 0.01 N.

Durometer is determined by ISO 7619-1.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

It should be understood that every maximum numerical limitation given throughout this specification will include every lower numerical limitation, as if such lower numerical limitations were expressly written herein. Every minimum numerical limitation given throughout this specification will include every higher numerical limitation, as if such higher numerical limitations were expressly written herein. Every numerical range given throughout this specification will include every narrower numerical range that falls within such broader numerical range, as if such narrower numerical ranges were all expressly written herein.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A valve for a dispenser, the valve comprising:
a valve body comprising:
an outer surface and an inner passageway extending about a longitudinal axis, wherein the inner passageway comprises a first passageway opening and a second passageway opening and a passageway surface extending from the first passageway opening to the second passageway opening; and
a first valve body surface and a second valve body surface opposite the first valve body surface, wherein the first valve body surface comprises an upper portion extending from the outer surface toward the longitudinal axis and a lower portion extending from the inner passageway toward the outer surface;
a valve stem extending through the inner passageway, wherein the valve stem comprises an outer stem surface and an inner stem surface opposite the outer stem surface, wherein the inner stem surface defines a channel; and
a resilient member disposed on at least a portion of the first valve body surface, wherein the resilient member is made from a resilient polymeric material and has a non-linear compression profile, and wherein the resilient member is a multi-piece member.

2. The valve of claim 1, wherein the resilient member comprises a thermoplastic material.

3. The valve of claim 2, wherein the thermoplastic material has a density of less than about 1.0 g/cc.

4. The valve of claim 2, wherein the thermoplastic material comprises thermoplastic elastomers.

5. The valve of claim 1, wherein the resilient member comprises a first resilient member portion and a second resilient member portion.

6. The valve of claim 5, wherein the first resilient member portion is disposed on at least a portion of the upper portion of the first valve body surface, and wherein the second resilient member portion extends over at least a portion of the lower portion of the first valve body surface such that a gap is formed between the second resilient member portion and the lower portion of the first valve body surface.

7. The valve of claim 5, wherein the first resilient member portion is made from a first material and the second resilient member portion is made from a second material, and wherein the first material is different than the second material.

8. The valve of claim 5, wherein the first resilient member portion has a first resilient member height and the second resilient member portion has a second resilient member height.

9. The valve of claim 8, wherein the first resilient member height and the second resilient member height are different.

10. The valve of claim 8, wherein the resilient member has a resilient member height.

11. The valve of claim 10, wherein the dispensing distance is less than about 50% of the resilient member height.

12. The valve of claim 10, wherein the filling distance is greater than about 50% of the resilient member height.

13. A valve for a dispenser, the valve comprising:
a valve body comprising:
an outer surface and an inner passageway extending about a longitudinal axis, wherein the inner passageway comprises a first passageway opening and a second passageway opening and a passageway surface extending from the first passageway opening to the second passageway opening; and
a first valve body surface and a second valve body surface opposite the first valve body surface, wherein the first valve body surface comprises an upper portion extending from the outer surface toward the longitudinal axis and a lower portion extending from the inner passageway toward the outer surface;
a valve stem extending through the inner passageway, wherein the valve stem comprises an outer stem surface and an inner stem surface opposite the outer stem surface, wherein the inner stem surface defines a channel;
an engagement member joined to the outer stem surface, wherein the engagement member comprises a first engagement surface and a second engagement surface; and
a resilient member disposed on at least a portion of the first valve body surface, wherein the resilient member comprises a first resilient member portion and a second resilient member portion, wherein the first resilient member portion is disposed on the upper portion of the first valve body surface, and wherein a gap is formed between the second resilient member portion and the lower portion of the first valve body surface.

14. The valve of claim 13, comprising a valve seal comprising a first seal surface and a second seal surface opposite the first seal surface, wherein the first seal surface abuts at least a portion of the passageway surface, and wherein a portion of the second seal surface operatively engages a portion of the outer stem surface.

15. The valve of claim 13, wherein the first resilient member portion is disposed between the upper portion of the first valve body surface and a portion of the first engagement surface of the engagement member.

16. The valve of claim 15, wherein the first resilient member portion has an unloaded resilient member height, wherein the valve stem may be positioned in a sealed configuration such that the first resilient member portion is compressed to a preload resilient member height between the upper portion of the valve body and the first engagement surface, wherein the preload resilient member height is less than the unloaded resilient member height.

17. The valve of claim 13, wherein the valve stem comprises a first orifice extending from the outer stem surface to the inner stem surface and in fluid communication with the channel.

18. The valve of claim 17, wherein the valve stem comprises a second orifice extending from the outer stem surface to the inner stem surface and in fluid communication with the channel.

19. A valve for a dispenser, the valve comprising:
a valve body comprising:
an outer surface and an inner passageway extending about a longitudinal axis, wherein the inner passageway comprises a first passageway opening and a second passageway opening and a passageway surface extending from the first passageway opening to the second passageway opening; and
a first valve body surface and a second valve body surface opposite the first valve body surface, wherein the first valve body surface comprises an upper portion extending from the outer surface toward the longitudinal axis and a lower portion extending from the inner passageway toward the outer surface;
a valve stem extending through the inner passageway, wherein the valve stem comprises an outer stem surface and an inner stem surface opposite the outer stem surface, wherein the inner stem surface defines a channel;
an engagement member joined to the outer stem surface, wherein the engagement member comprises a first engagement surface and a second engagement surface; and
a resilient member disposed on at least a portion of the first valve body surface, wherein the resilient member comprises a first resilient member portion and a second resilient member portion, wherein the first resilient member portion has a first resilient member portion height and the second resilient member portion has a second resilient member portion height, wherein the first resilient member portion height and the second resilient member portion height are different.

20. The valve of claim 19, wherein the first resilient member portion height is greater than the second resilient member portion height.

21. The valve of claim 19, wherein the first resilient member portion height is less than the second resilient member portion height.

22. A valve for a dispenser, the valve comprising:
a valve body comprising:
an outer surface and an inner passageway extending about a longitudinal axis, wherein the inner passageway comprises a first passageway opening and a second passageway opening and a passageway surface extending from the first passageway opening to the second passageway opening; and
a first valve body surface and a second valve body surface opposite the first valve body surface;
a valve stem extending through the inner passageway, wherein the valve stem comprises an outer stem surface and an inner stem surface opposite the outer stem surface, wherein the inner stem surface defines a channel;
an engagement member joined to the outer stem surface, wherein the engagement member comprises a first engagement surface and a second engagement surface; and
a resilient member disposed on at least a portion of the first valve body surface, wherein the resilient member comprises a first resilient member surface and a second resilient member surface, wherein a gap is formed between at least one of a portion of the second engagement surface and the first resilient member surface.

23. A valve for a pressurizable dispenser, the valve comprising:
a valve body comprising:
an outer surface and an inner passageway extending about a longitudinal axis, wherein the inner passageway comprises a first passageway opening and a second passageway opening and a passageway surface extending from the first passageway opening to the second passageway opening; and
a first valve body surface and a second valve body surface opposite the first valve body surface;
a valve stem extending through the inner passageway, wherein the valve stem comprises an outer stem surface and an inner stem surface opposite the outer stem surface, wherein the inner stem surface defines a channel;
an engagement member joined to the outer stem surface, wherein the engagement member comprises a first engagement surface and a second engagement surface; and
a resilient member disposed on at least a portion of the first valve body surface, wherein the resilient member comprises a first resilient member surface and a second resilient member surface, wherein a gap is formed between at least one of a portion of the second resilient member surface and the first valve body surface.

* * * * *